April 24, 1945.   H. CAVE ET AL   2,374,415
TOOTH BRUSH TUFTING MACHINE
Filed June 30, 1942   14 Sheets-Sheet 1

INVENTORS
Henry Cave
Alfred H. Fuller
Alfred L. Lefebvre
By Arthur B. Jenkins
ATTORNEY

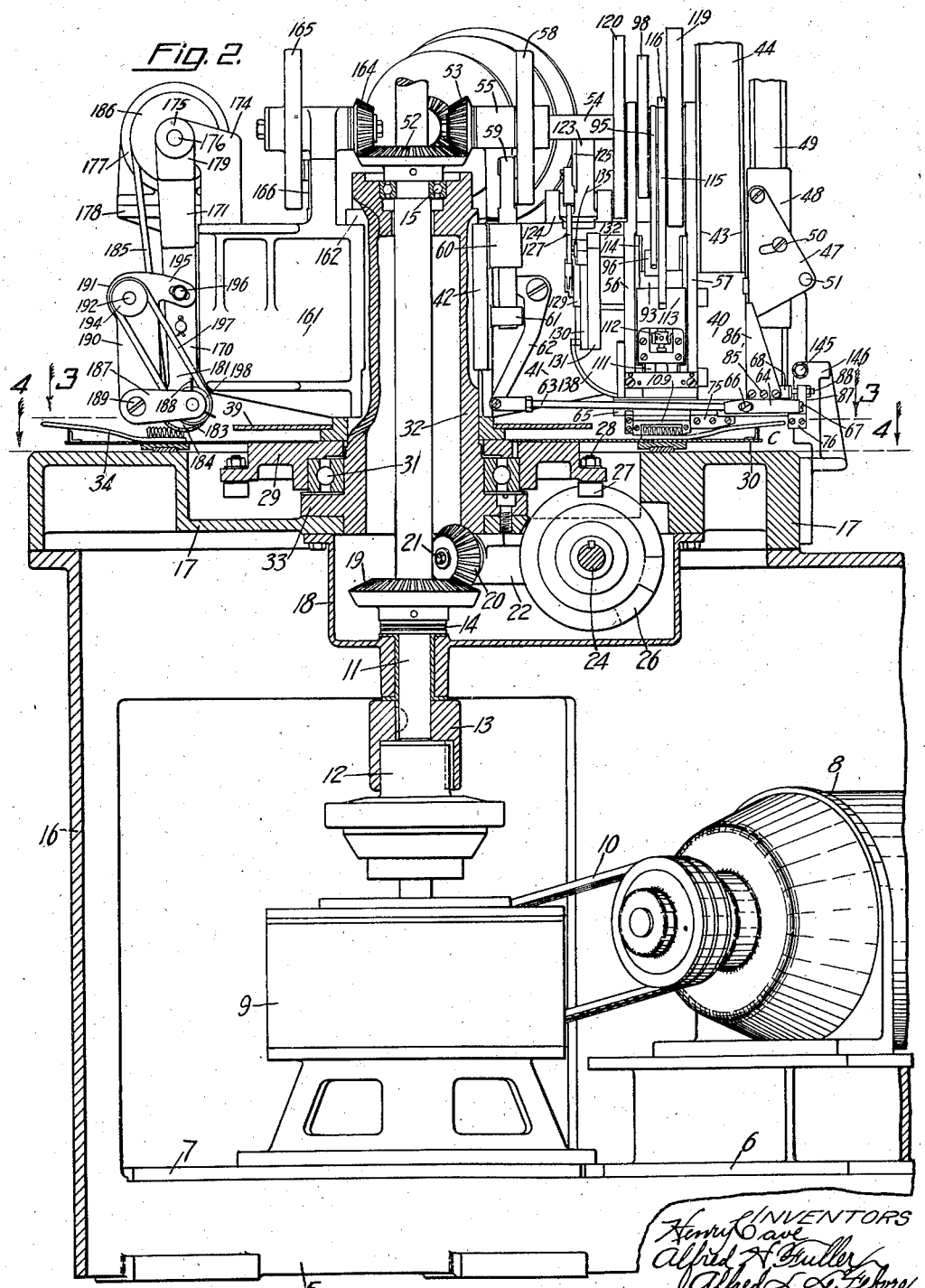

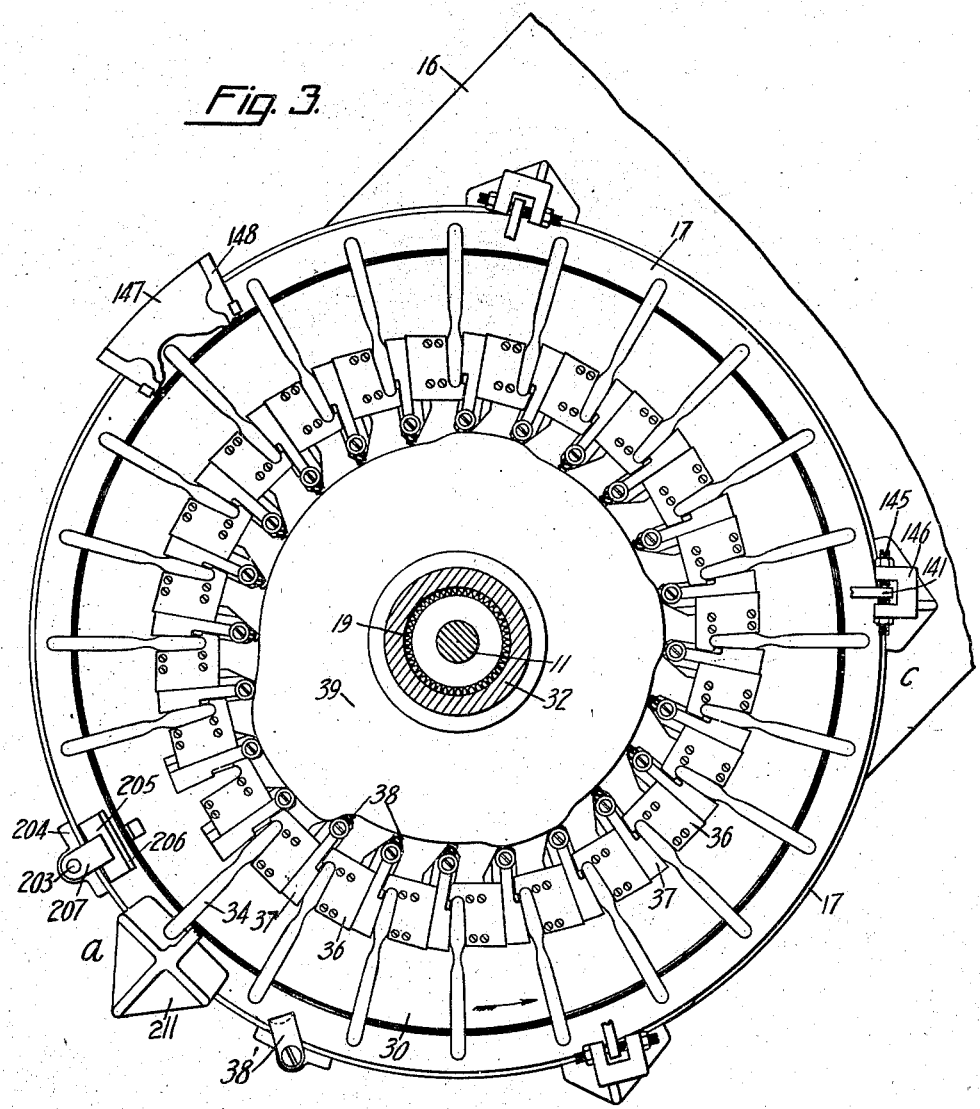

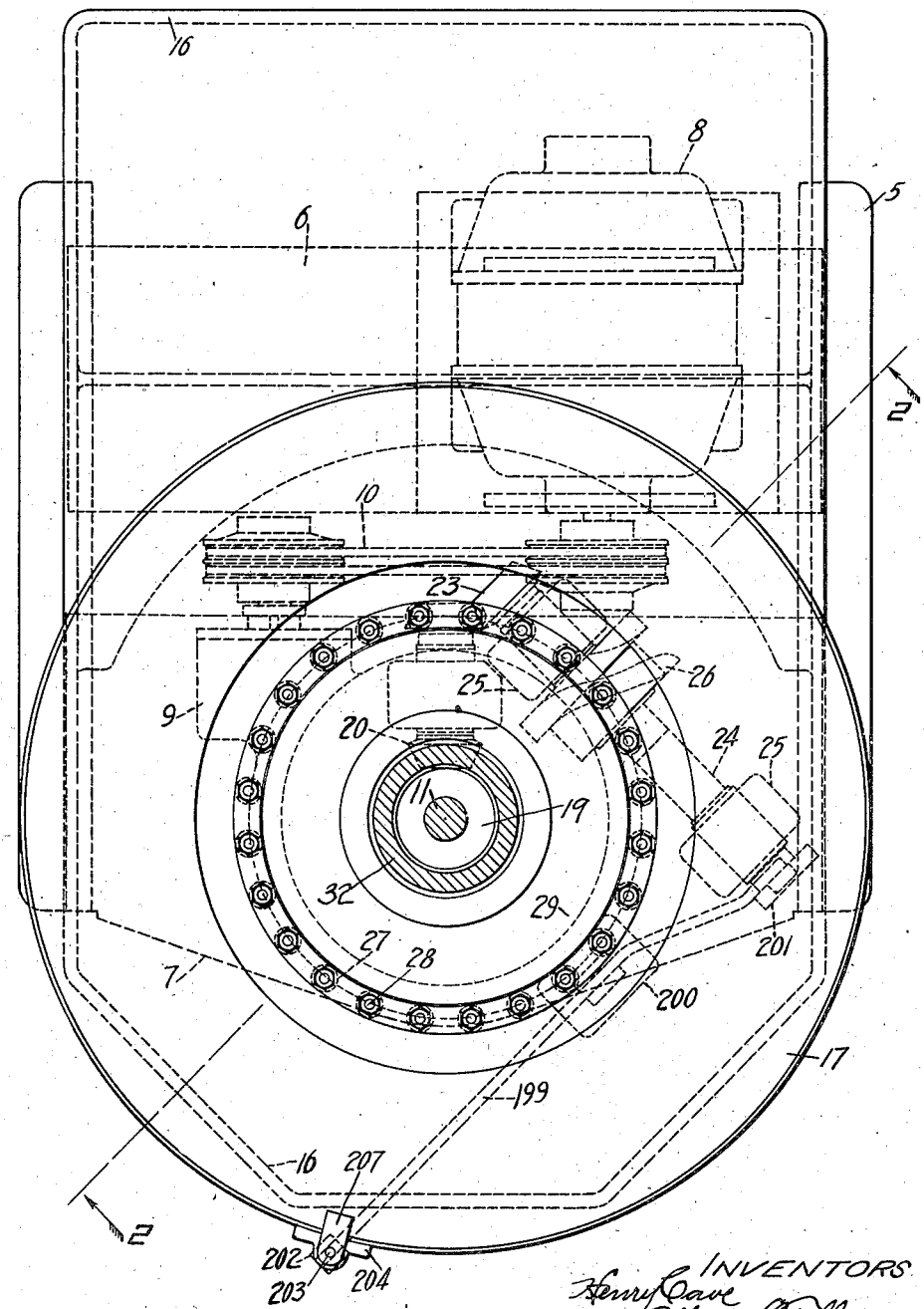

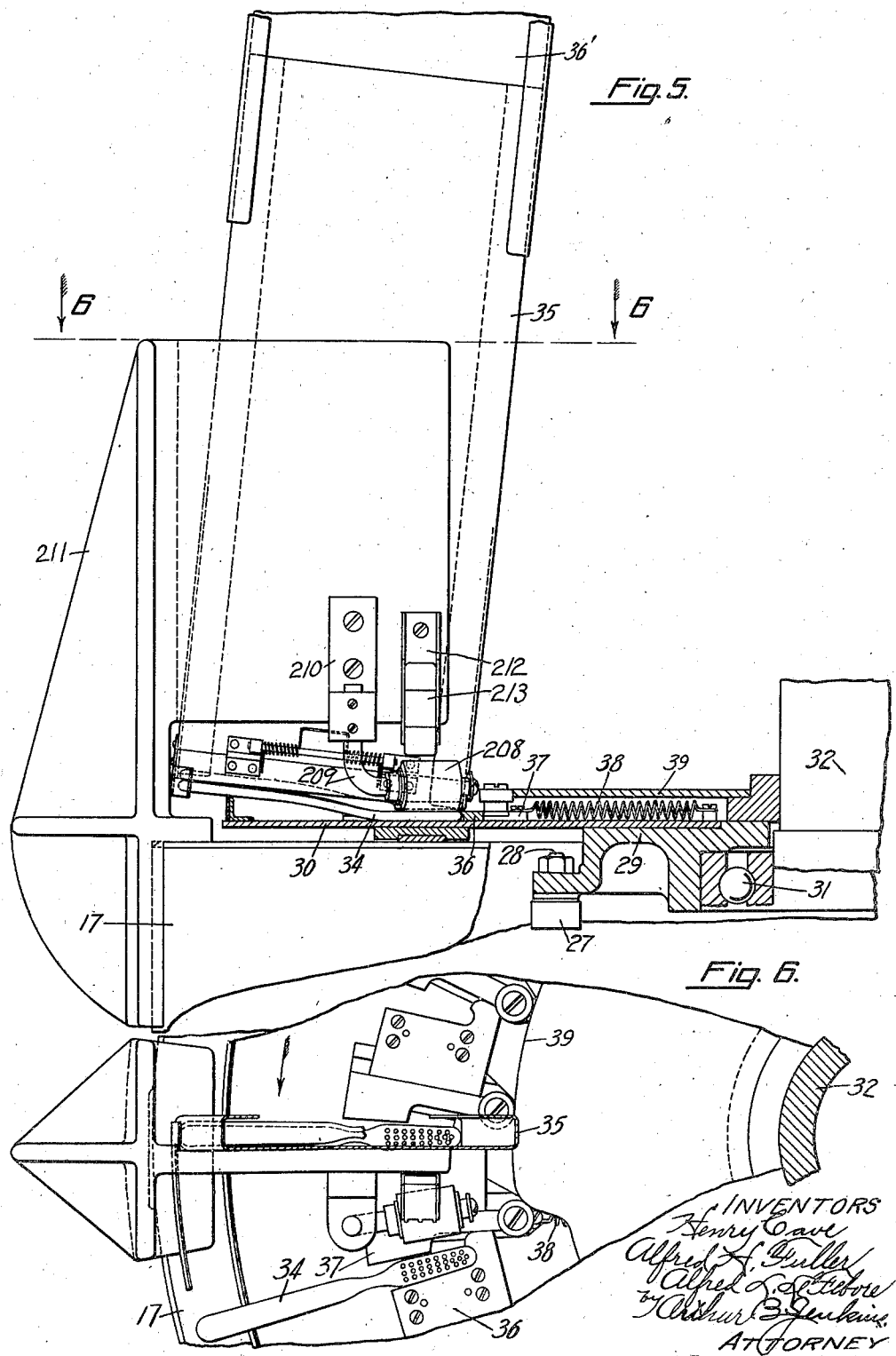

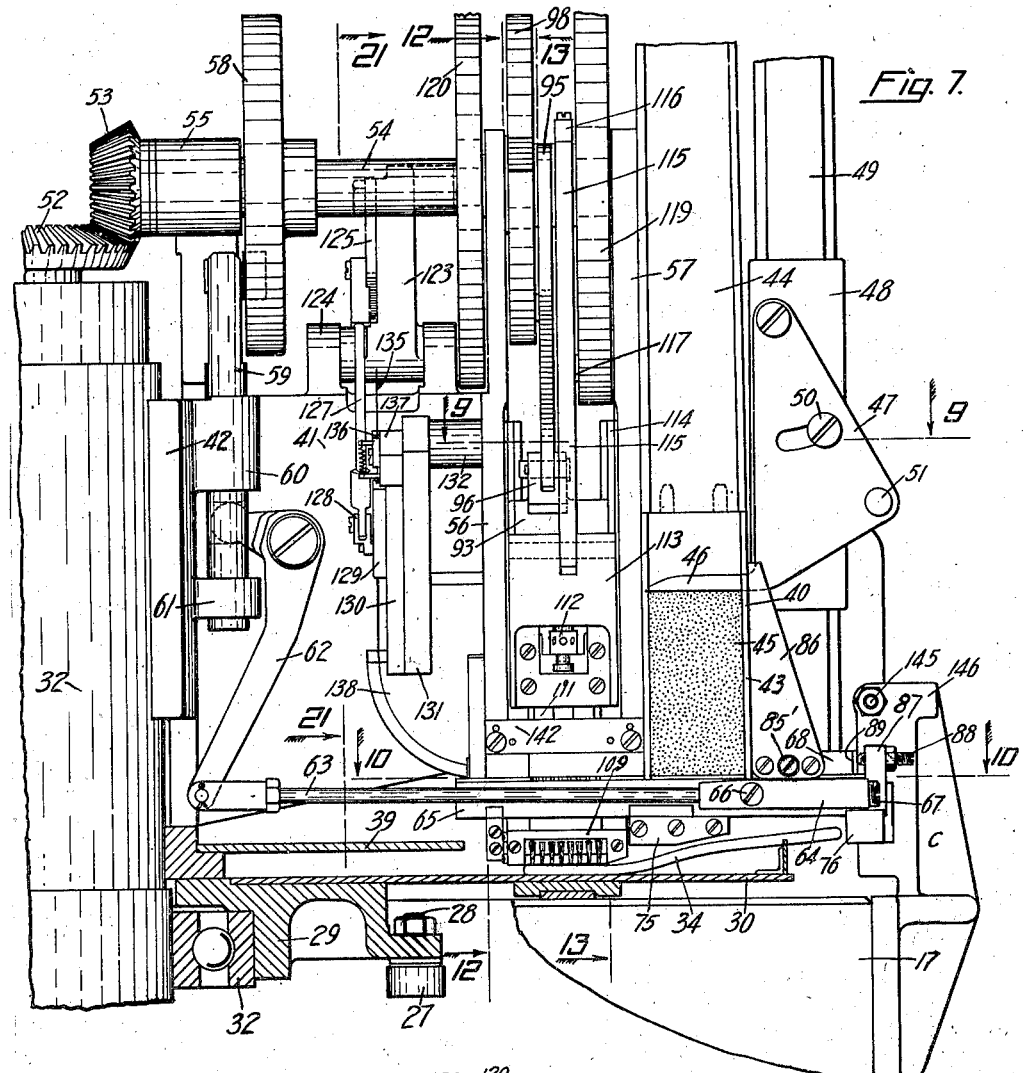
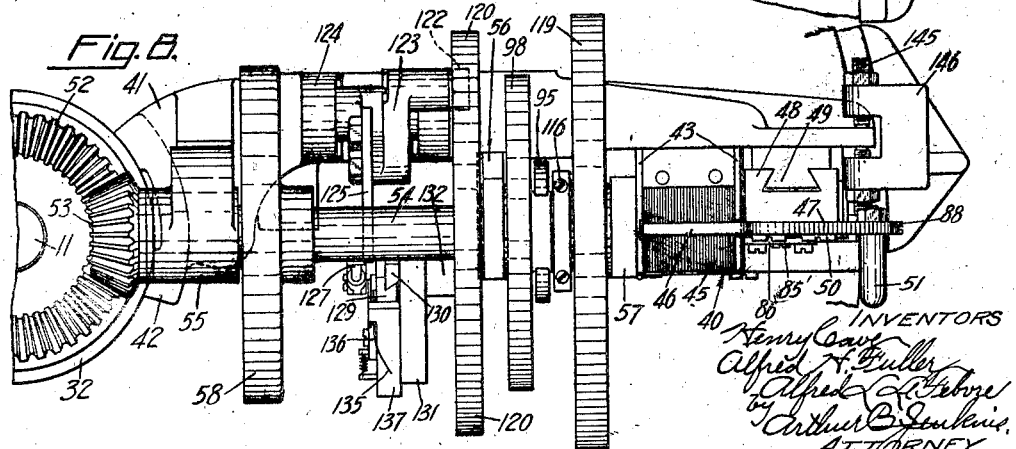

April 24, 1945.　　　H. CAVE ET AL　　　2,374,415
TOOTH BRUSH TUFTING MACHINE
Filed June 30, 1942　　14 Sheets-Sheet 7
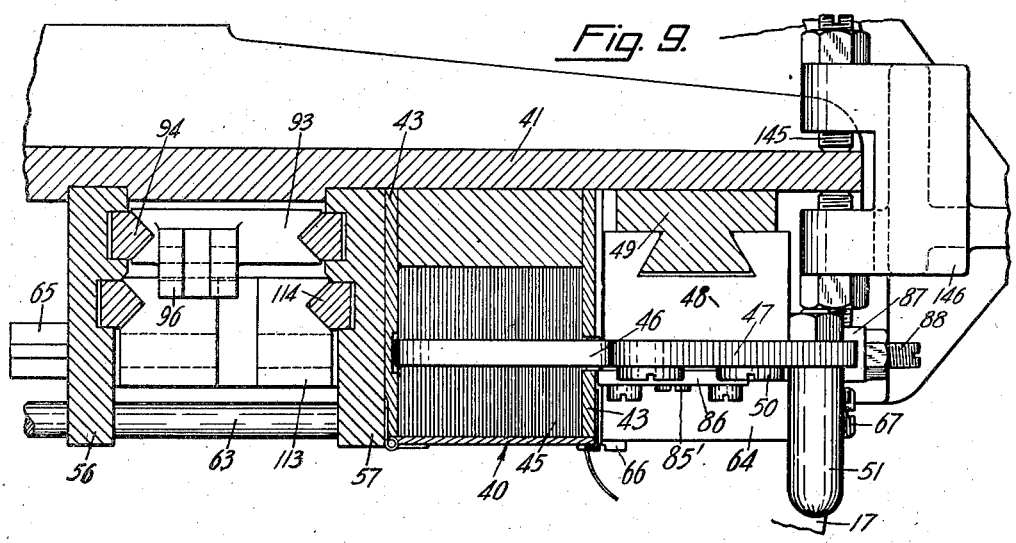
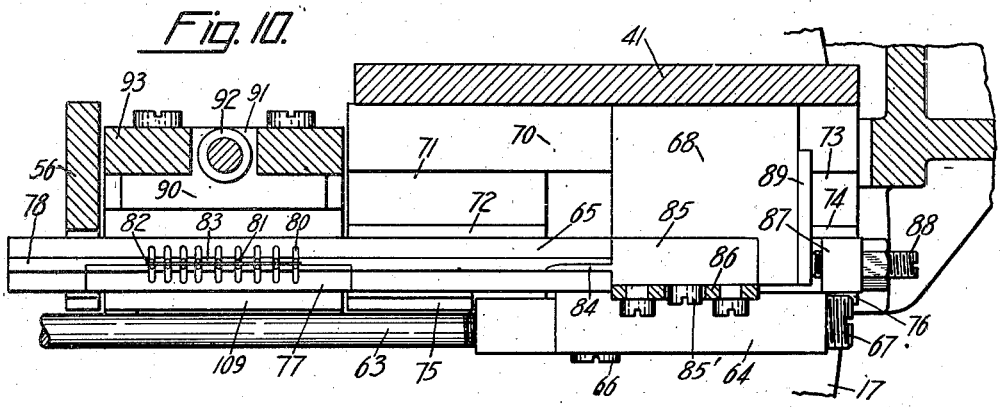
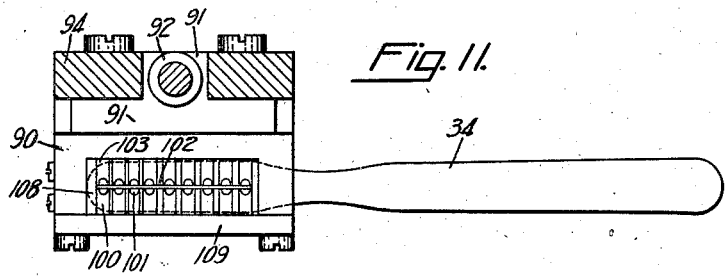

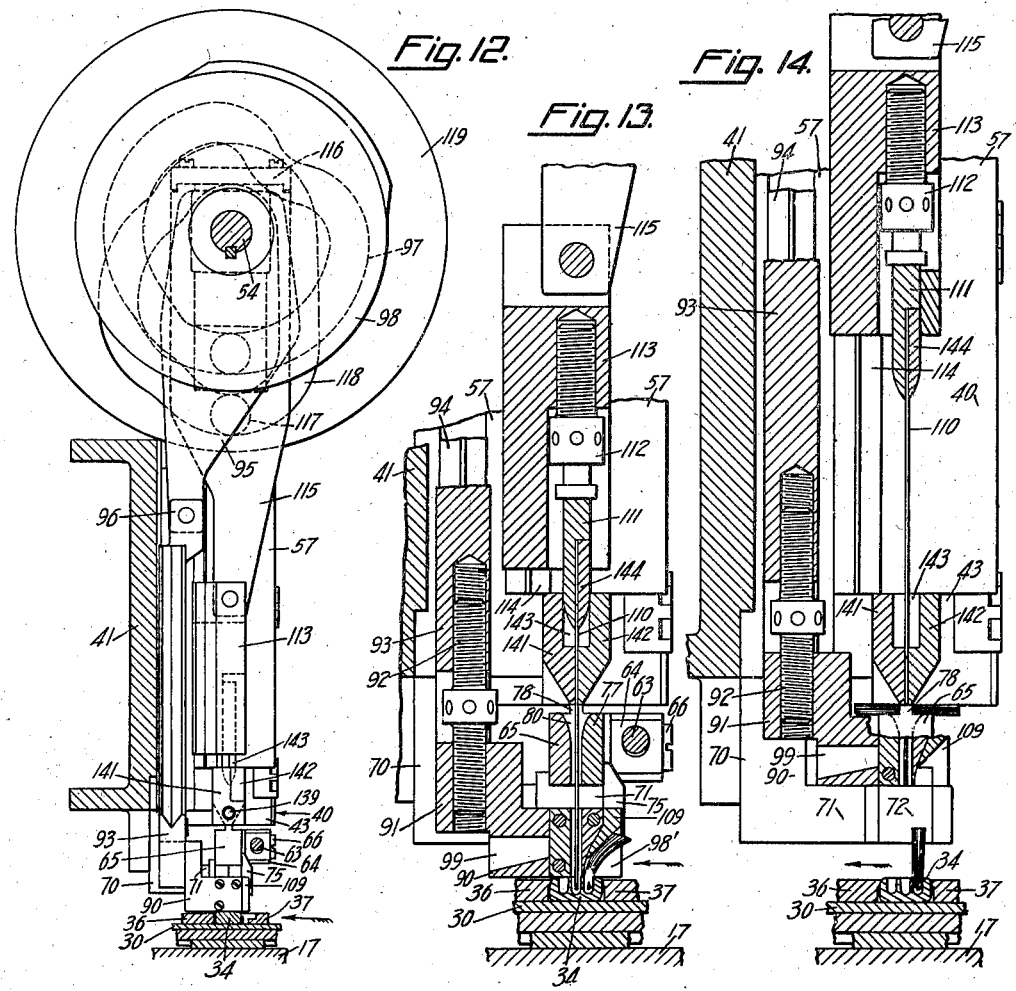
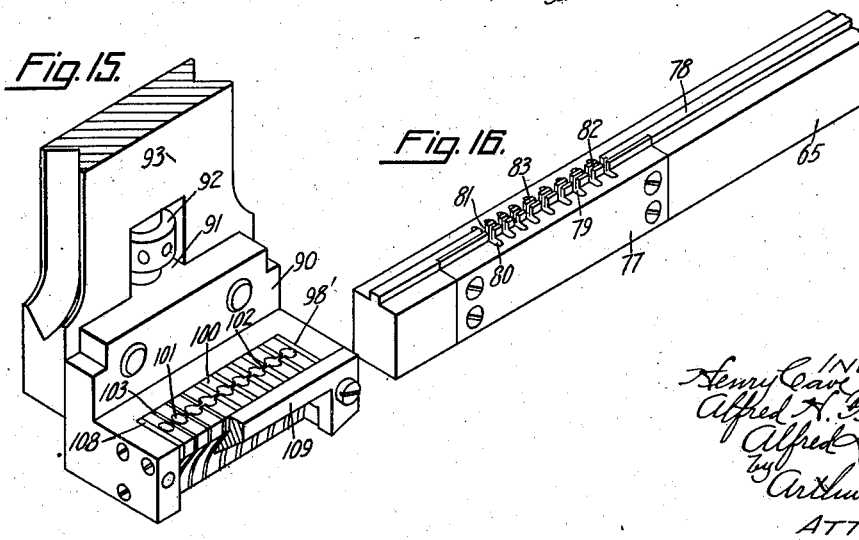

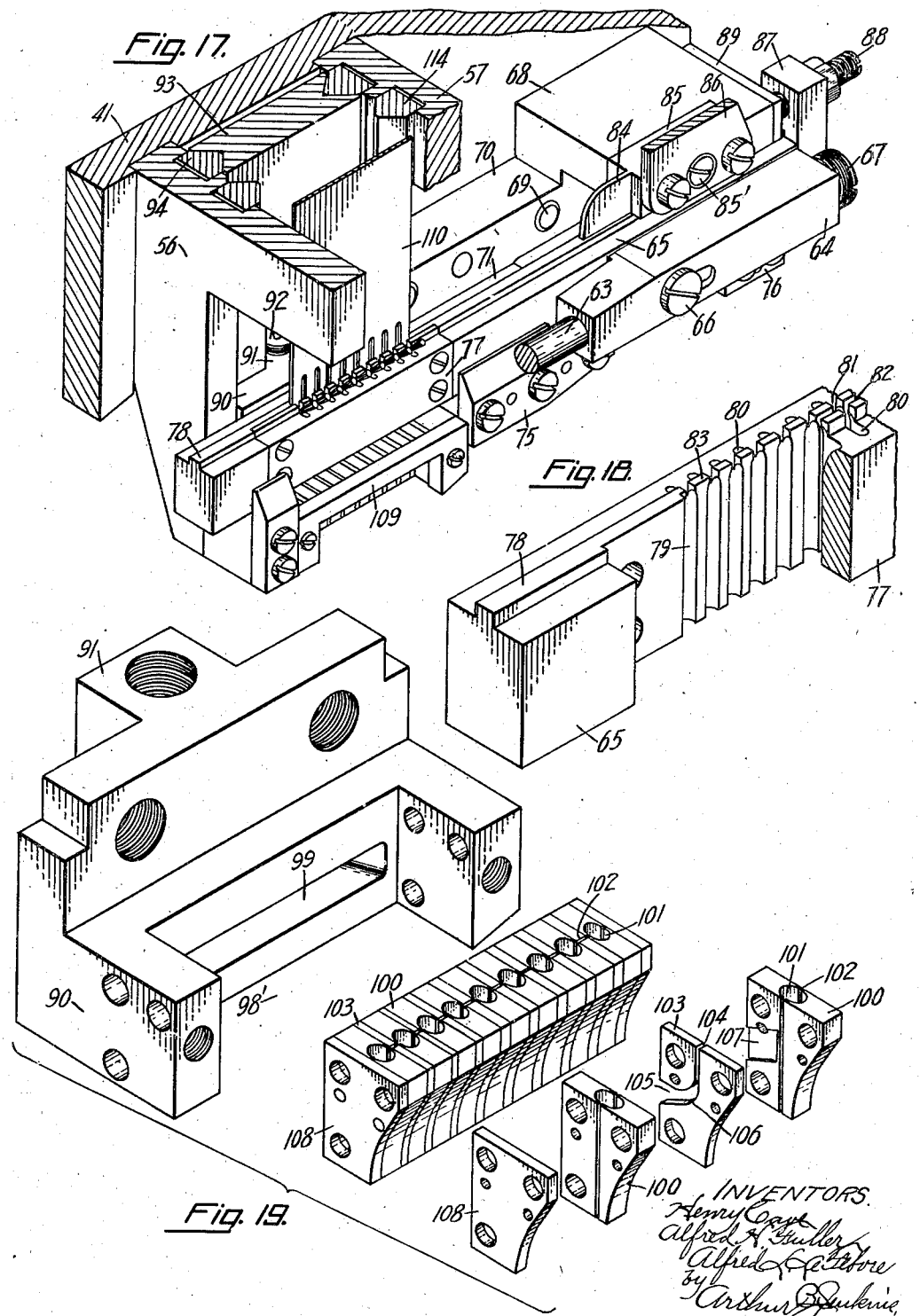

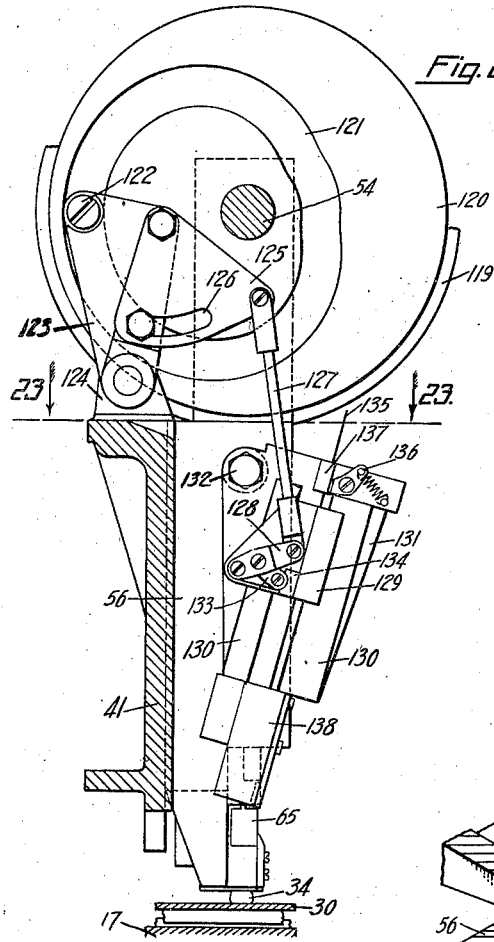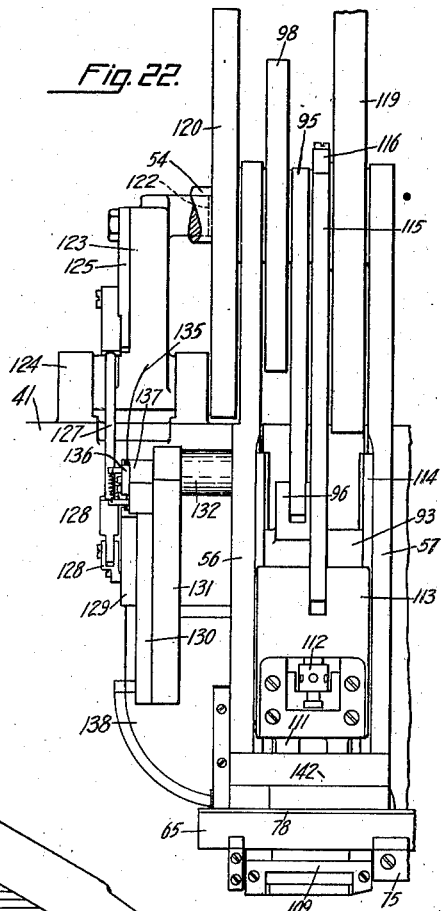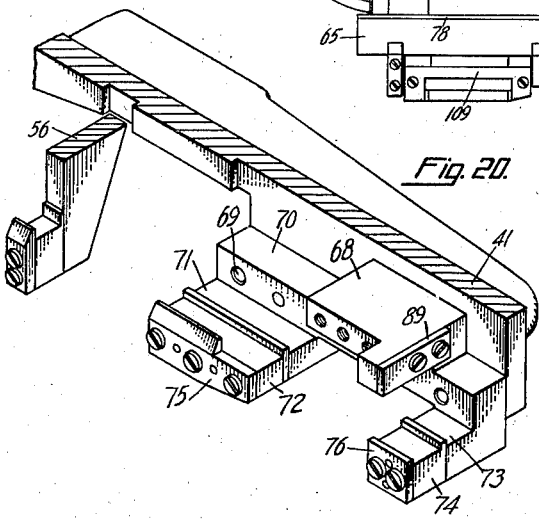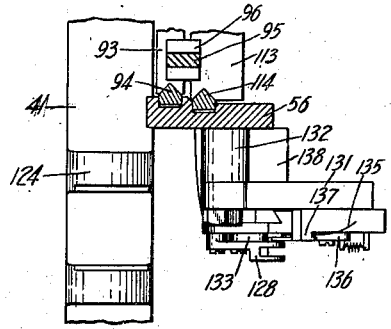

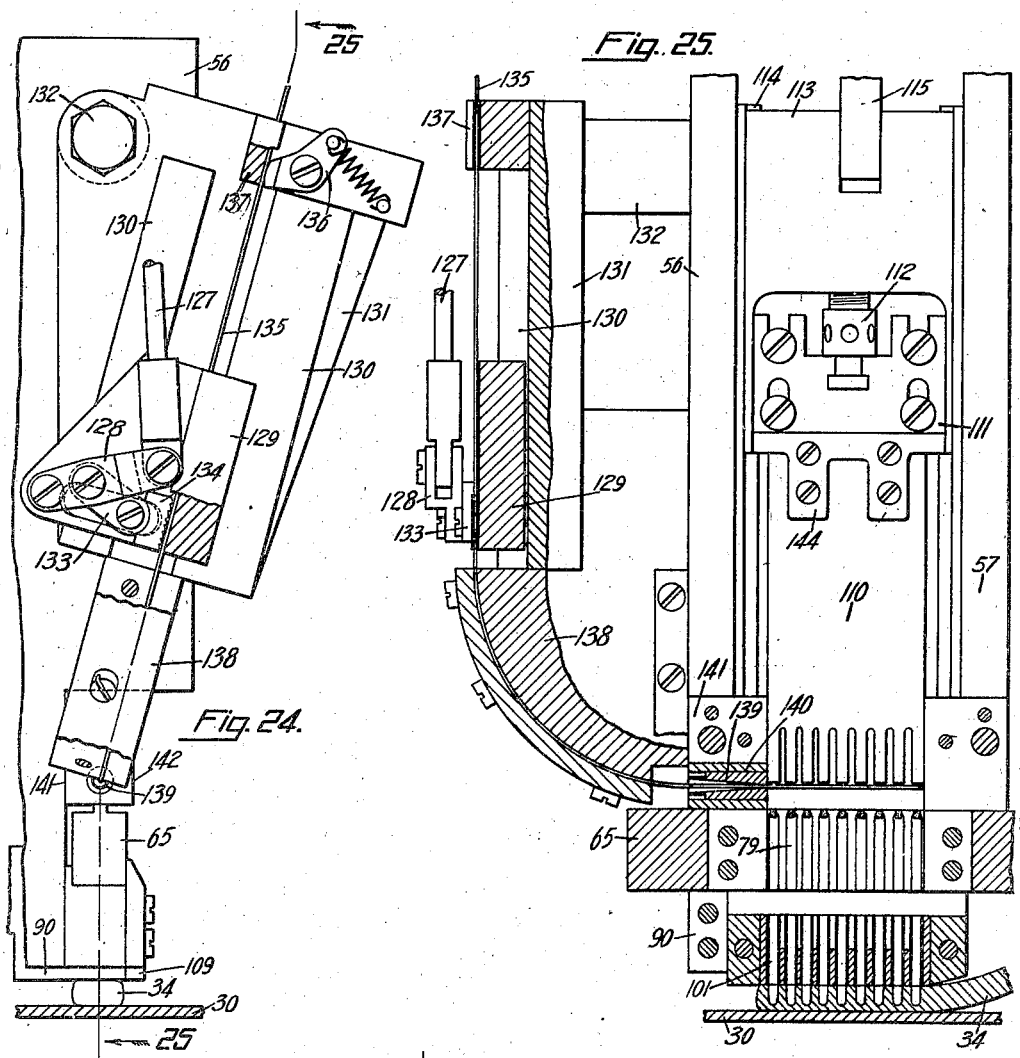

April 24, 1945.         H. CAVE ET AL         2,374,415
TOOTH BRUSH TUFTING MACHINE
Filed June 30, 1942         14 Sheets-Sheet 12

April 24, 1945. H. CAVE ET AL 2,374,415

TOOTH BRUSH TUFTING MACHINE

Filed June 30, 1942  14 Sheets-Sheet 13

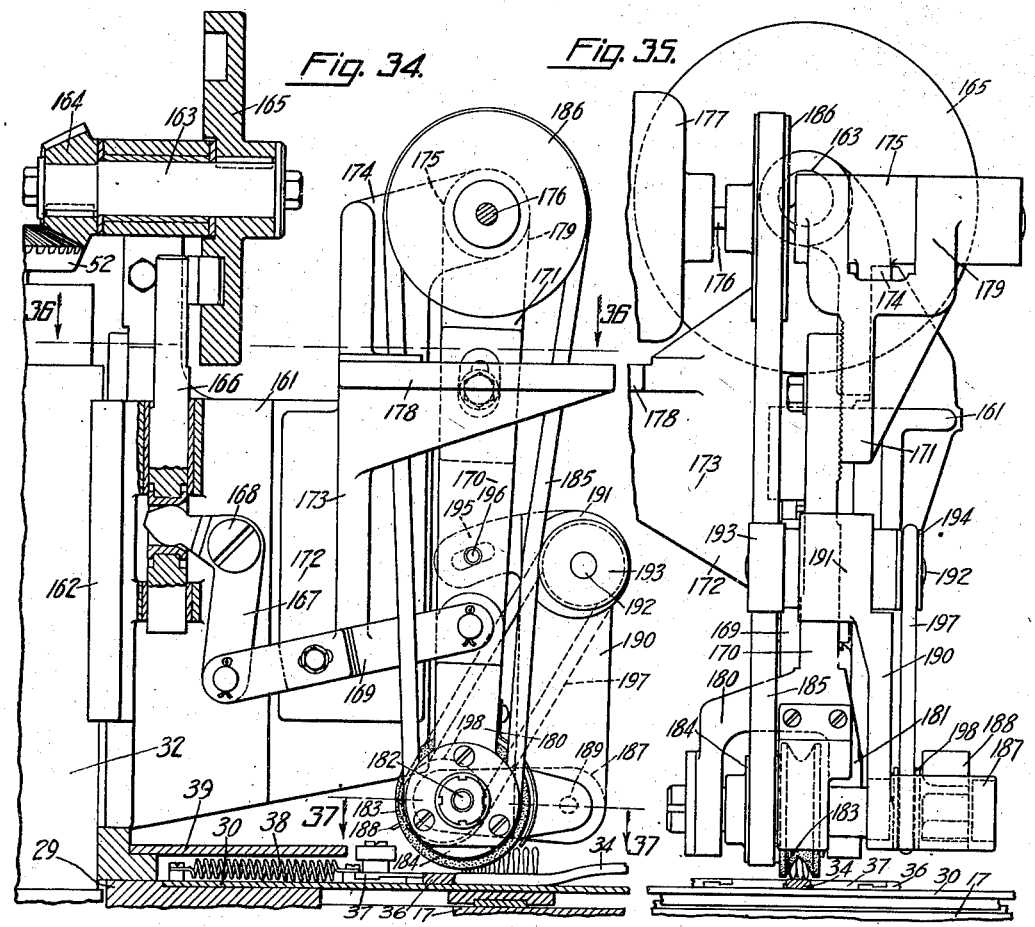
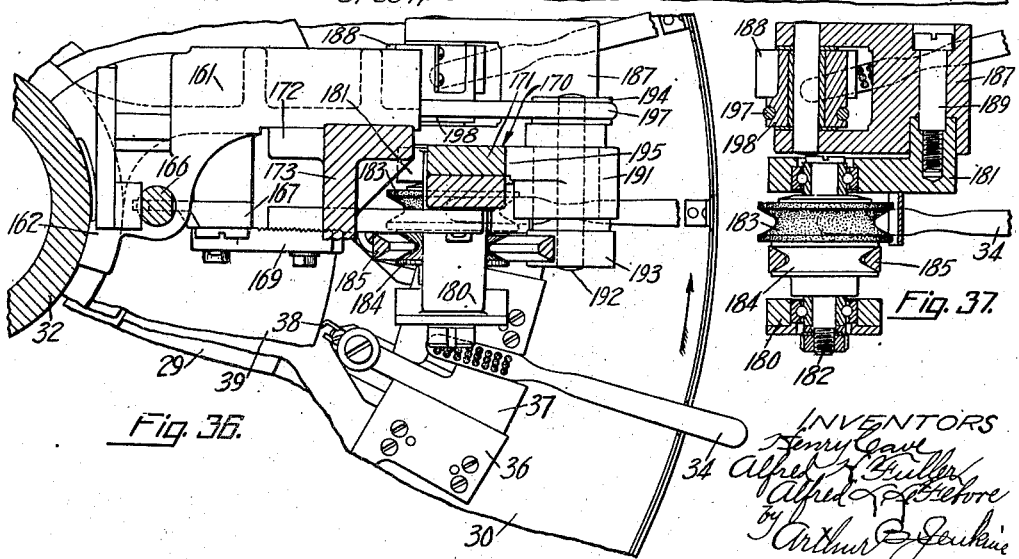

Patented Apr. 24, 1945

2,374,415

UNITED STATES PATENT OFFICE 2,374,415

TOOTHBRUSH TUFTING MACHINE

Henry Cave, Hartford, Alfred H. Fuller, West Hartford, and Alfred L. Le Febvre, Windsor, Conn., assignors to The Fuller Brush Company, Hartford, Conn., a corporation of Connecticut Application June 30, 1942, Serial No. 449,080

30 Claims. (Cl. 300—5)

This invention relates to machines for forming tufts of brush material and securing such tufts in bases or backs and although not limited in its field is particularly adapted for use in the making of tooth brushes, and an object of the invention, among others, is the production of a machine of this type that shall be rapid in operation and particularly effective in the quality of its production.

One form of a machine embodying the invention and in the construction and use of which the objects herein set out, as well as others, may be attained is illustrated in the accompanying drawings, in which—

Figure 2 is a view in vertical section on a plane passing along the axis of the main shaft of the machine, and on a plane denoted by the broken lines 2—2 of Figs. 1 and 4.

Figure 4 is a view in horizontal section on a plane denoted by the broken line 4—4 of Fig. 2 and illustrating the lower part of the machine.

Figure 5 is a detail view on enlarged scale partially in section illustrating the manner of supply of the brush backs to the rotating table and on a plane denoted by the broken line 5—5 of Fig. 1.

Figure 6 is a view in section on a plane denoted by the broken line 6—6 of Fig. 5.

Figure 7 is a view in front elevation on enlarged scale of one of the bristle feeding mechanisms, this being a view in section of substantially one-half of the upper part of the machine on a vertical radial plane denoted by the broken line 2—2 of Fig. 1.

Figure 8 is a top plan view of the structure as shown in Fig. 7.

Figure 9 is a view in horizontal section, scale still further enlarged, on a plane denoted by the broken line 9—9 of Fig. 7.

Figure 10 is a view on enlarged scale in horizontal section substantially on the broken line 10—10 of Fig. 7.

Figure 11 is a top plan view of the tuft receiver illustrating a brush in position to receive the tufts.

Figure 12 is a view in vertical section on a plane denoted by the broken line 12—12 of Fig. 7.

Figure 13 is a view in vertical section on enlarged scale on a plane denoted by the broken line 13—13 of Fig. 7.

Figure 14 is a view similar to that of Fig. 13 but still further illustrating the mechanism of that figure.

Figure 15 is a perspective view on enlarged scale of the tuft receiver.

Figure 16 is a similar view of one end of the picker bar shown in position to pass on to said receiver.

Figure 17 is a perspective view on enlarged scale illustrating the tuft forming mechanism.

Figure 18 is a perspective view on a scale still further enlarged, and partially broken away, of the tuft receiving end of the picker bar.

Figure 19 is a similar view on a scale still further enlarged of the parts making up the tuft receiver with the parts separated but in position for assembly.

Figure 20 is a perspective view of the picker bar support.

Figure 21 is a view in vertical section on a plane denoted by the broken line 21—21 of Fig. 7.

Figure 22 is a view in front elevation of the mechanism shown in Fig. 21.

Figure 23 is a view in horizontal section on a plane denoted by the broken line 23—23 of Fig. 21.

Figure 24 is a view in side elevation of the wire feeding mechanism with parts broken away to show construction.

Figure 25 is a view in vertical section on a plane denoted by the broken line 25—25 of Fig. 24.

Figure 26 is a view in vertical section on enlarged scale illustrating the manner of forcing the bristles into the brush back.

Figure 27 is a view in vertical section on a plane denoted by the broken line 27—27 of Fig. 26.

Figure 34 is a view in side elevation, partially in section, illustrating the final trimming and finish mechanism.

Figure 35 is a view in elevation looking from a point at the right of Fig. 34.

Figure 36 is a view in section on a plane denoted by the broken line 36—36 of Fig. 34.

Figure 37 is a view in section on a plane denoted by the broken line 37—37 of Fig. 34.

Figure 1:
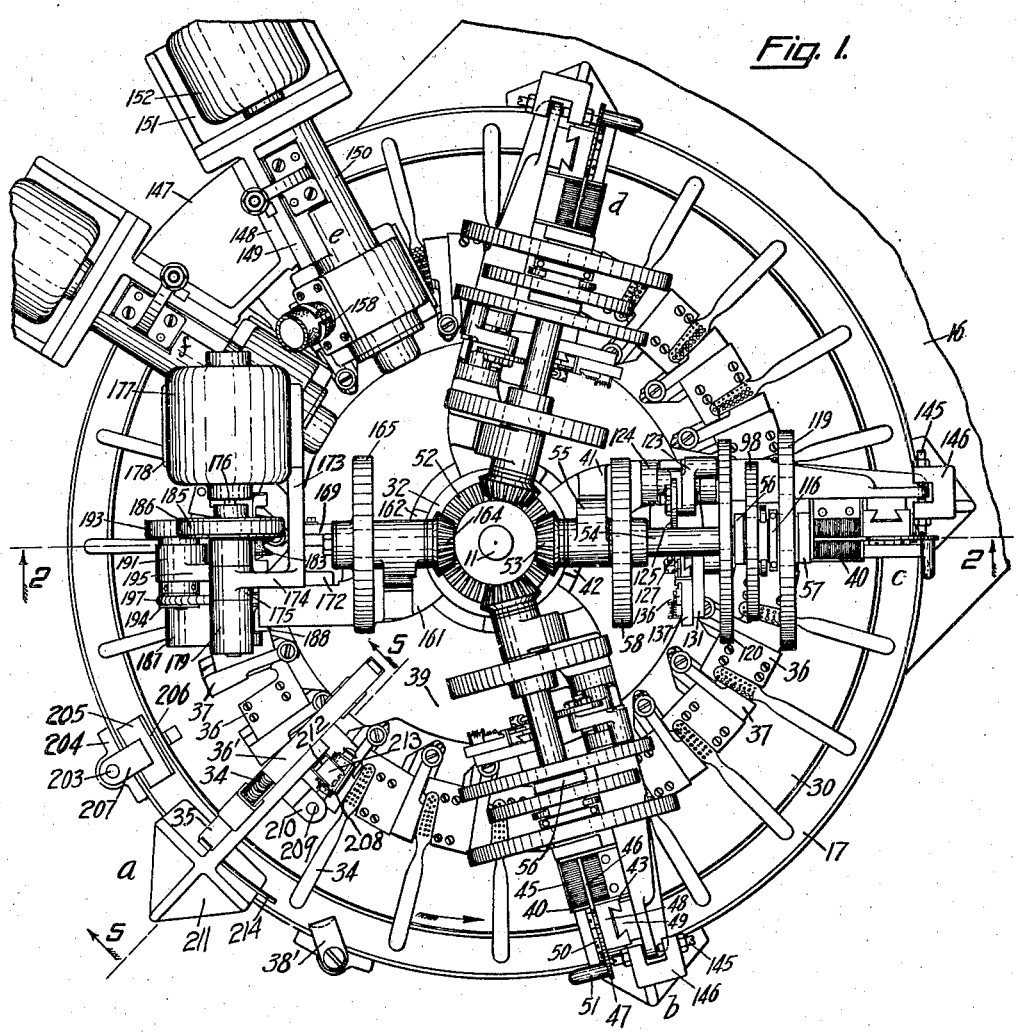
Figure 1 is a top plan view of the machine.

Figure 38, Sheet 1, is a detail sectional view on enlarged scale illustrating the operation of the ejecting mechanism.

In the accompanying drawings the numeral 5 denotes the side bars of a supporting base which are joined by supporting plates 6—7, the former supporting a motor 8 and the latter a box 9 enclosing a reduction gearing of well-known construction which is connected with the motor by a flexible drive as a wedge belt 10. The reduction gearing mechanism is connected in any suitable manner with a main driving shaft 11 supported in a vertical position and connected with a hub 12 of a member of the geared connection as by means of a coupling 13 keyed to said hub and also to the lower end of the shaft. The shaft is supported by means of a ball thrust bearing 14 near the lower end thereof and a ball bearing 15 near the upper end thereof.

A box frame 16 is supported upon the base, rising therefrom and a round stationary table 17 is supported by said box-like frame at the upper end thereof. A drop box enclosure 18 is secured to the under side of the table 17 and encloses a bevel gear 19 in mesh with a bevel pinion 20 secured to one end of a short shaft 21 mounted in a bearing 22 supported by the table 17, the opposite end of said shaft being connected by miter gears 23 with a table rotating shaft 24 mounted in bearings 25 supported by the table 17 on the under side thereof. An indexing cam 26 is secured to the shaft 24 and has a groove within which indexing rollers 27 are successively received, said rollers being mounted upon studs 28 projecting downwardly from the under side of a rotating support 29 of a rotating table 30 in the form of a disk secured to the upper side of said support, said support being mounted on bearings 31 at the lower end of a supporting sleeve 32 surrounding and spaced from the main shaft 11 and with its lower end projecting into an opening in the table 17, as shown in Fig. 2, a flange 33 on said sleeve resting upon the bottom of a recess in the table 17 and secured thereto. The gear 19 is secured to the main shaft 11 and is driven thereby to operate the indexing mechanism just described.

Figure 30:
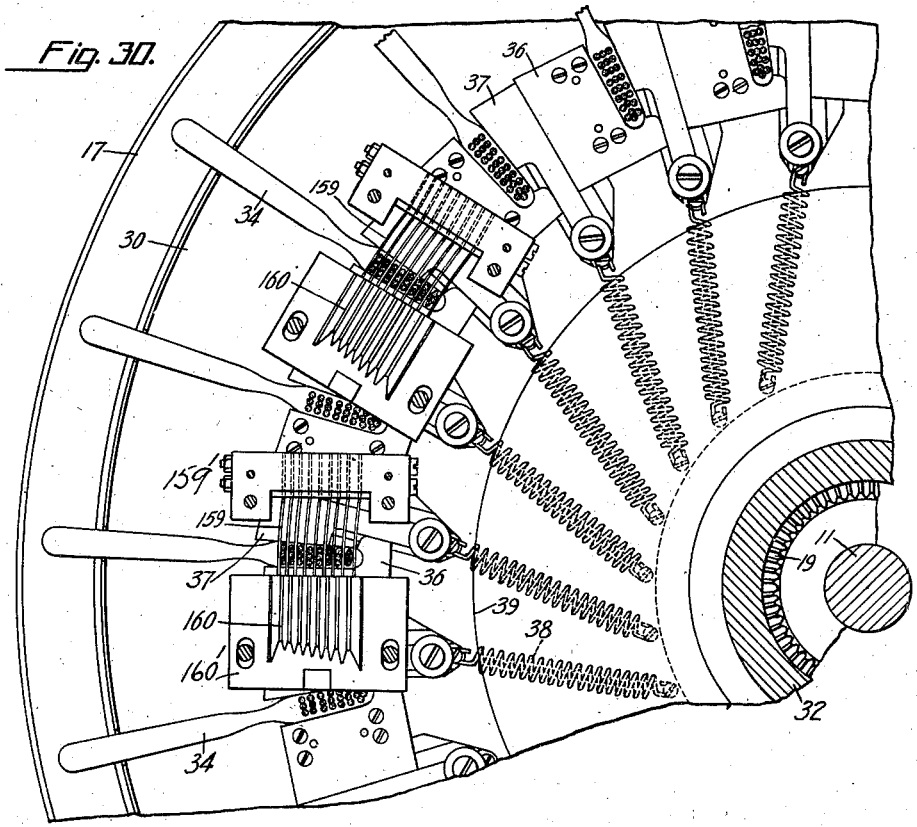
Figure 30 is a view in horizontal section on a plane passing substantially just above the base trimmers.

Brush bases 34 comprising the handle and head portions of a brush are contained in a hopper 35 vertically arranged and which may be supplied with said bases as from a magazine 36' manually placed in position at the upper end of the hopper. The brush bases are entered by gravity into clamps each comprising a stationary jaw 36 and a movable clamping jaw 37 which is urged into clamping position by a clamping spring 38 secured at one end to the table 30 and at its opposite end to the jaw as shown in Figures 5, 6 and 30 of the drawings. The clamping jaws are released from their clamping positions by means of a jaw releasing cam 39 just before the table 30 in its step-by-step rotating movement reaches the brush back loading station a as seen in Fig. 6, the cam holding each clamping jaw in its open position until a brush base 34 has been located between the jaws after which the cam releases the clamping jaw and the latter is moved into clamping position by the action of its spring 38.

It will be noted from an examination of Fig. 1 that the heads of the brushes are tapered from a wider dimension near the handle to a narrower dimension at the opposite or tip end and the spaces between the two members of each set of jaw members is tapered to conform to this shape of the brush heads, and as the movable jaw is forced into its clamping position the brushes are securely clamped and held in place.

As the table 30 receives a step-by-step movement from the position where it receives the brush bases 34 the outer ends of the handles encounter a swinging base seating member 38' pivotally mounted on the stationary table 17 at the edge thereof, this member and a recess at the end thereof being located in the path of movement of the ends of the brush handles which pass in to said recess, and the pivot of the member is so arranged that in its swinging movement it moves toward the center of the table 17 with a result that the brush blanks in moving past said seating member have the tip extremities of the heads forced tightly into the recesses in the fixed clamping jaw members, as is clearly shown in Figure 1 of the drawings.

From the loading station a the table in its advancing step-by-step movements carries the brush bases to a bristle receiving station b where a row of bristles is inserted in one of the rows of holes in the brush bases and from a bristle hopper 40 positioned to supply the rows of bristles preferably to one of the outside rows, in the structure as herein shown there being three rows of bristles extending in parallel relation lengthwise of the heads of each of the brush blanks and this initial supply of bristles being to the last outside row which passes under the hopper.

*Bristle Feeding Mechanism.*—Bristle feeding mechanism, including the hopper just mentioned, is supported in a stationary position above the table 30 on one side of the supporting sleeve 32 as shown in Fig. 7. This mechanism is secured on a bracket 41 comprising a base 42 horizontally, adjustably secured to the supporting sleeve 32, said bracket extending radially from the sleeve and with its lower edge spaced a slight distance above the table 30. This bracket supports not only the bristle feeding mechanism but also wire feeding mechanism presently to be described. The sides 43 of the hopper are secured to the bracket 41 in any suitable manner and a loading extension 44 may be fitted to the top of the hopper as a means of additional supply if desired. The bristles 45 are urged downwardly within the hopper by the toe 46 of a toe supporting plate 47 pivotally secured to the side of a weight 48 slidably mounted on a dovetail shaped guide 49 secured to the bracket 41 as shown in Figs. 7 and 8 of the drawings. The plate 47 is pivotally attached for the purpose of insertion of the toe 46 to engage the top of the bristle mass in different positions, a stop screw 50 extending through a slot in the plate into the weight 48 limiting swinging movement of the plate and a handle 51 being employed to remove the toe 46 from and insert it within the hopper by movement of the weight 48 vertically by means of the handle in a manner that will be readily understood.

An actuating gear 52 is secured to the driving shaft toward its upper end and meshes with a pinion 53 secured to a cam shaft 54 mounted in a main bearing 55 extending from the upper edge of the bracket 41 and in the upper ends of guide bars 56 and 57 projecting from the face of the bracket 41 and secured thereto in any suitable manner and as shown in Figs. 7 and 9. A picker bar actuating cam 58 is secured to the shaft 54 and has a cam groove in which a roller mounted on a stud projecting from a picker bar actuating plunger 59 is received, the plunger being mounted in bearings 60—61 projecting from the bracket base 42 as shown in Fig. 7. A bell crank lever 62 is pivotally mounted on the bracket 41, one end of the lever engaging within a notch in the plunger 59 and the opposite end of the lever being pivotally attached to an end of a picker bar actuating rod 63 secured at its opposite end to a picker bar block 64 attached to a picker bar 65 by means of a resilient connection comprising a screw 66 secured to the picker bar and extending into a slot in the block 64, said screw being forced to one end of the slot by means of a spring within a hole in the block 64. The tension of the spring is regulated by an adjusting screw 67. A picker bar supporting block 68 is secured to the bracket 41 near its outer end as by means of bolts 69 projecting into the bracket, as shown in Fig. 17, this block comprising a projection 70 with an extension 71 to which a picker bar support 72 is secured and which extension operates in connection with a similar extension 73 for another support 74, as shown in Fig. 20. Each of the supports has guide lips located on one side which act in connection with guide plates 75—76 to form a guideway for the picker bar 65 for sliding movement on the supports 72—74.

The picker bar has a recess formed on one side for the reception of a filling piece 77 which is secured in place as by means of screws, the bottom of said recess terminating within a picking rib 78 extending lengthwise along the center of the bar. Bristle receiving holes 79 are formed in the direction of depth through the bar, complemental parts of each hole being located in the bottom of the recess and in the filling piece 77. Said holes each have enlarged mouths 80 with slots 81 cutting across the rib and a wire receiving groove 82 is extended along the center of the rib cutting across the slots 81 as shown in Figs 10 and 18. The formation of the groove and slots provides a row of fingers 83 on opposite sides of the groove which separate recesses for the reception of brush fibers which are pressed into the recesses by the action of the toe 46 and the weight 48 on the top of the bristle mass in the hopper. In one movement of the picker bar across the lower end of the hopper 40 the recesses between the fingers are filled with wisps of bristles and a reverse movement of the picker bar carries the wisps to a position underneath tuft forming fingers presently to be described. A guard 84 in the form of a lip extends from a block 85 secured to the block 68 as by means of screws heretofore mentioned and screw 85' which also secure a hopper support 86 to said blocks as shown in Fig. 17, the support being rigidly secured to one of the sides 43 of the hopper 40. The guard prevents bristles from crowding under the edge of the hopper as the picker bar is moved in one direction, and the opposite side of the hopper is in close contact with the bristles so that no superfluous bristles will be contained in the pockets between the fingers 83. A stop 87 is secured to the end of the picker bar and carries an adjusting screw 88 which thrusts against a hardened stop plate 89 to properly position the opposite end of the picker bar.

A tuft receiver is mounted for vertical reciprocating movement into position to receive tufts from the picker bar and guide them into brush heads underlying said receiver. This receiver comprises an L-shaped base 90 having a lug 91 with a hole threaded to receive a capstan screw 92 for adjustably positioning the receiver, the opposite end of said screw engaging within a receiver support 93 mounted for vertical sliding movement on guides 94 secured in the guide bars 56—57, as shown in Fig. 9. A fork 95 is pivotally attached at one end to the support 93 as between ears 96, the opposite end of said fork straddling the shaft 54 and having a roller engaging in a cam groove 97 in a box cam 98 secured to the shaft 54, as shown in Fig. 12.

The foot of the L-shaped base 90 is provided with a recess 98' with an opening 99 from the back thereof through the base for the escape of short pieces of wire which are cut off in the operation of the machine. The recess 98' encloses a receiver unit which is made up of a number of bristle containers 100 with holes 101 extending through them from top to bottom and with slots 102 through the walls between said holes, as shown in Figure 19. Cutting plates 103 also comprising a part of the receiver unit are located between the containers, these plates having slots 104 extending downwardly from the top edge into cutting recesses 105, the edges of the recesses forming cutters 106 to cooperate with inserting fingers to sever wires in a manner to be presently described. The containers have pockets 107 on one side located opposite the recesses 105 in the plates 103, the pocket 107 on the container located at the right as seen in Fig. 19 being located on the opposite side of the container from the pockets in the other containers. End plates 108 comprise the end of the unit which fits snugly within the recess 98'. The structures of the cutting plates and the containers are such as to divide these pieces, but they are held together by dowels or pins inserted through holes in the several pieces as will be readily understood by an examination of Fig. 19, and these pieces comprising the receiver unit are held in place by a fastening bar 109 secured to opposite ends of the L-shaped base 90, as by means of screws and as shown in Figs. 15 and 17.

A tucking finger plate 110 is secured to the lower end of a plate support 111 depending from a capstan adjusting screw 112 engaged with a finger carrier 113 slidably mounted on guides 114 secured to the guide bars 56—57, as shown in Fig. 25. A tucking finger actuator 115 is pivotally attached at its lower end to the carrier 113 at its upper end and is in the form of a fork straddling the shaft 54 at its upper end with a cap 116 closing the open end of the fork and with a stud 117 containing a roller located in a cam groove 118 in a tucking finger actuating cam 119 secured to the shaft 54, as shown in Figs. 7 and 12.

The mechanism just described comprises means for creating the bristle tufts into form for insertion in the brush heads, but has omitted an inclusion of the wires which are inserted in the folds of the tufts, said wires being laid across the layers of bristles just before the doubling operation, this wire feeding mechanism being composed as follows:

*Wire feed.*—A wire feeding cam 120 having a cam groove 121 is secured to the cam shaft 54, said groove receiving a roller on the end of a stud 122 projecting from a rocker 123 pivotally mounted between ears 124 secured to and projecting from the upper edge of the bracket 41, as shown in Fig. 21 of the drawings. A plate 125 is adjustably, pivotally attached to the rocker 123, said plate having an adjusting slot 126 through which an adjusting screw extends to secure the plate in different positions of adjustment on the rocker 123, as shown in Fig. 21. A wire feeding rod 127 is pivotally attached to one corner of the triangularly shaped plate 125, the opposite end of said rod being pivotally connected to one end of a wire clamping lever 128, the opposite end of said lever being pivotally attached to a wire feed block 129 slidably mounted between guides 130 arranged on the side of a wire feed supporting block 131 adjustably secured to the end of a stud 132 projecting from one side of the guide bar 56, as shown in Fig. 25. A toggle lever 133 is pivotally attached at its opposite ends to the clamp lever 128 and a wire clamping jaw 134 slidably mounted in a recess in the side of the feed block 129, as shown in Fig. 24. The wire 135 extends from any suitable source of supply, as a spool located above the machine, to the feeding mechanism just described, entering an opening at the top of the supporting block 131 between the end of a spring pressed stop lever 136 and a fixed jaw 137 which prevent backward movement of the wire and continuing through an opening in the wire feed block 129 and through an opening in a wire guide 138 which directs the end of the wire into an opening 139 at the lower end of the bar 56. The wire guide 138 is secured in any suitable manner to the wire feed supporting block 131 and projects from the lower end thereof, as shown in Figs. 24 and 25. The opening 139 is formed in a hardened bushing 140 extending through one end of a guide and support 141 for the tucking finger plate 110, this guide being secured to the lower ends of guide bars 56—57, formed by cutting away the lower ends of said bars, said guide and support comprising a bar 142 which is secured in place as by means of screws extending entirely through the guide and securing the whole to the lower ends of the bars 56—57. The guide has a pocket 143 formed partially in the back of the guide and partially in the bar 142 which pocket receives projections 144 extending downwardly from the plate support 111 as shown in Figs. 13 and 14.

The apparatus herein disclosed is constructed particularly to form and insert tufts in tooth brushes having three rows of tufts, the two outside rows each containing eight tufts and the center row containing nine tufts. There are therefore three different stations which are designated in the drawings by the letters b—c—d and a description of one set of these tufting mechanisms will apply to all of them, and for this reason a showing of one of the mechanisms only is made in the drawings, this mechanism just described particularly applying to the set of mechanisms located at station c, this being the station at which the longest row containing nine tufts is formed, but the mechanisms at the other stations are the same except that the tucking finger plates are provided with eight fingers instead of nine. Therefore in order to adapt all of the mechanisms to attain the same purpose the plate 125 is mounted for adjustment by means of the slot 126 so that feeding operation of the block 129 may be varied to provide for feed of the wire 135 to obtain such range as may be required for rows of tufts of any desired lengths, not only for the length of the rows shown herein but of even longer or shorter rows. Similarly, adjustment of the bracket 41 hereinbefore referred to is for the purpose of positioning the mechanisms to supply tufts to any of the rows as may be desired, set screws 145 in an extension 146 rising from the stationary table 17 engaging opposite sides of the bracket, as shown in Fig. 8.

The operation of the machine thus far described is as follows:

The motor 8 being in operation the shaft 24 is constantly rotated and the rollers 27 are successively entered into the groove in the indexing cam 26 (see Fig. 4), this groove extending about one-fifth of the way around the cam, imparting a one-step movement to the rotating table 30. At the end of this movement of the table the rollers 28 are successively released from said cam groove and are encountered by a straight formation or dwell on the cam, whereby the table 30 remains at rest for a remaining four-fifths of the rotation of the cam, during which time the several operations of loading the table with a brush blank, producing tufts of bristles, supplying them to the several grooves in the brush blanks, securing said bristles in place, trimming and ejecting the blanks take place. In each one-step movement of the rotating table a set of vacant clamp jaws 36—37 are presented underneath the hopper 35 and a brush blank 34 is deposited between the jaws, and in the next one-step movement of the table the handle of the blank just deposited encounters the seating member 38' that firmly seats the blank between the jaws.

During the three one-step movements next following the seating of the blank between the clamping jaws, the blanks are successively presented at the first tufting station designated by the letter "b." The dwell in the rotation of the table 30 hereinbefore referred to now takes place, during which time the last row of holes on the following side of the blank is filled with tufts of bristles which are formed and secured in place during the dwell. This movement of a blank to a tufting station and the dwell for the tufting operation consumes one rotation of the cam 26, each of the one-step movements consuming one rotation of such cam and the five one-step movements of the table for conveying a blank from one filling station to another consuming five complete rotations of the cam 26.

As hereinbefore explained the filling of the center row of holes in the brush blank takes place at the second filling station c and the description of the forming and filling mechanisms as herein illustrated and heretofore described applies specifically to such mechanism at station c although such mechanisms are exactly alike except as to the number of tufts supplied to the brush blanks. As the blanks successively come to rest underneath the bristle hopper 40 the picker bar 65 is moved forward underneath and past said hopper by the action of the cam 58, plunger 59, bell crank lever 62 and picker bar actuating rod 63, the cam 58 being shaped to effect a dwell in the movement of the bar 65 with the holes 79 in the picker bar located over and registering with the holes 101 in the tuft receiver, the picker bar at this time resting upon the foot of the L-shaped base 90. In this position of the parts the several wisps of bristles between the fingers 83 on the picker bar extend crosswise of said bar and the cam 120 through the medium of the rocker 123, plate 125, wire feeding rod 127 and the mechanism mounted on the supporting block 131 operates to project a length of wire 135 across the layer of wisps of bristles on the picker bar, being spaced above said layer as shown in Fig. 25. In this position the tucking finger plate 110 by movement of the finger carrier 113 operated by the actuator 115 connected with the actuating cam 119 is forced downwardly cutting off a piece of wire of a length substantially that of the width of the finger plate 110 and in a continuation of this movement the fingers on the plate 110 force said wire against the wisps of brush fibers and the latter with the wire are forced through the picker bar into the holes 101 in the tuft receiver, during which movement the wire is severed by the cutters 106 into short lengths slightly greater than the diameter of the holes 101 which lengths are forced down into said holes and the shorter lengths in the slots in the plates 103 passing into the pockets 107 from which they pass out through the opening 99 in the tuft receiver.

In this operation of forming the brush tufts and of moving them from the picker bar 65 into the tuft receiver the finger carrier 113 starts its downward movement to tuck the wisps into the picker bar, and during this movement the cam 98 acting upon the fork 95 operates the receiver support 93 and the tuft receiver to move the latter downwardly away from the picker bar and into contact with the brush blank 34 upon the table 30, in this operation the tucking fingers continuing their movements until the wisps are inserted into the brush backs and the tuft receiver ending its downward movement against the brush blanks upon the table 30. The mechanism above described now operates to reverse the movement of the parts, the tucking fingers retreating to clear the picker bar which moves to the right, as seen in Fig. 7, to clear the tuft receiver for upward movement to release the blanks, thereby placing said parts in their starting positions.

The table now receives five one-step movements to locate the backs at station $d$, the interval between each of the one-step movements being consumed by filling operations at each of the stations $b$—$c$—$d$, other operations taking place at other stations by mechanisms to be now described.

Figure 29:
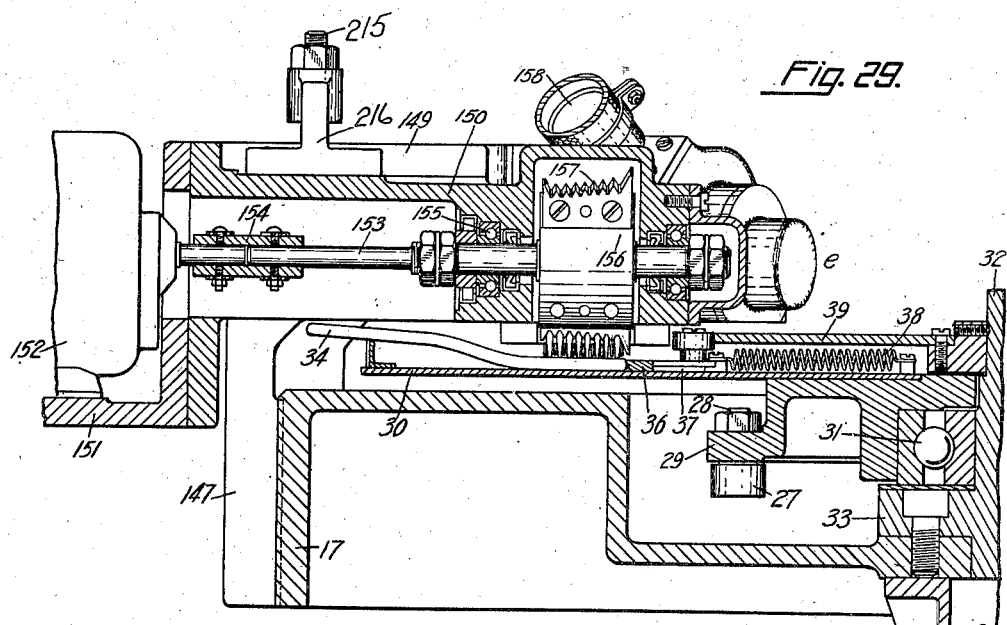
Figure 29 is a view in section on a plane denoted by the broken line 29—29 of Fig. 28.

After leaving station $d$ the blanks or backs in the next five one-step movements arrive at station $e$, which is a trimming station and which comprises trimming mechanism supported upon a bracket 147 secured to the edge of the stationary table 17 as shown in Fig. 29.

Figure 28:
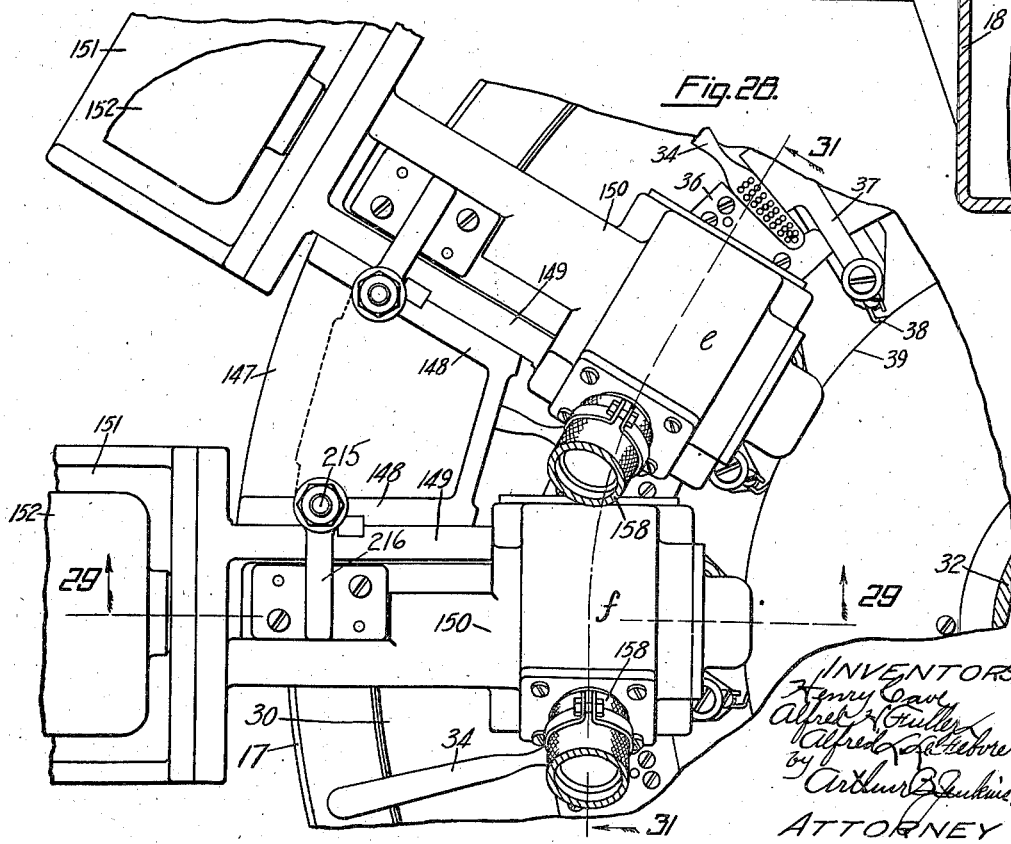
Fig. 28 is a top plan view on enlarged scale of the trimmer mechanisms.
Figures 31, 32:
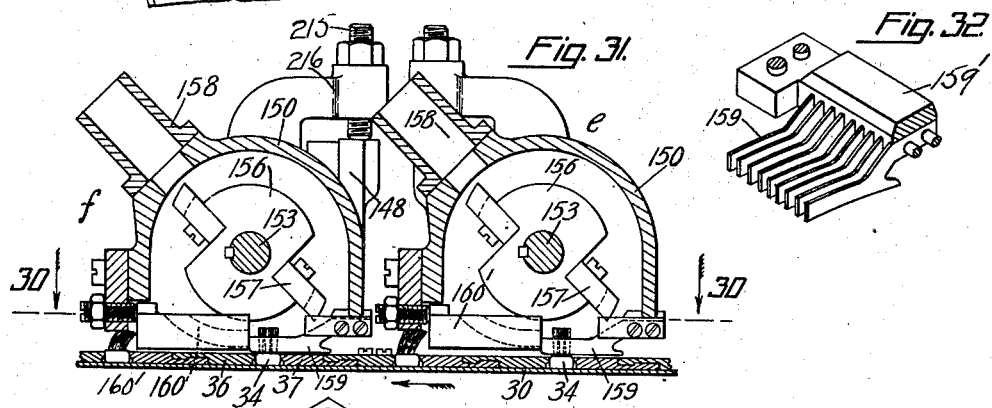
Figure 31 is a view in cross section through the trimmer mechanisms on a plane substantially indicated by the broken line 31—31 of Fig. 28.
Figure 32 is a detail perspective view of one of the sets of base trimmers.
Figure 33:
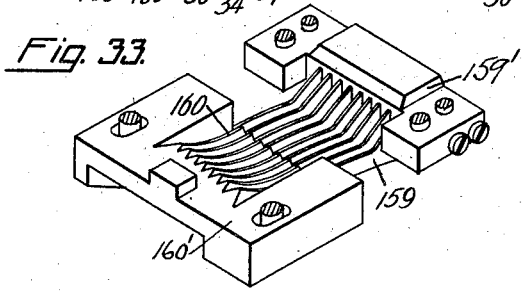
Figure 33 is a similar view of two cooperating sets of base trimmers.

There are two sets of trimming mechanisms which are alike except that one furnishes a more finished trim than the other, the trimmer at station $e$ effecting a coarse trim and that at station $f$ effecting a finer trim, and in view of this similarity the description herein is applied to the trimmer at station $f$, this being the one on which the section of Fig. 29 is taken. Both of the trimmers are supported by the bracket 147, being located on opposite sides of said bracket. The bracket 147 is attached to the edge of the table 17 and extends over the top of the table toward the center thereof for some little distance as shown in Fig. 28, said bracket having upstanding supporting flanges 148 at opposite edges thereof to which supporting flanges 149 of housings 150 are secured in any suitable manner as by means of screws, not shown herein, passing through slots for the purpose of vertical adjustment of the housings in a manner to be presently described, both of said flanges on the bracket and a housing abutting squarely against one another. A shelf 151 for a motor 152 is secured to the end of the housing 150, a cutter driving shaft 153 being connected with the motor spindle by means of a coupling 154, said shaft being supported by ball bearings 155 mounted in the housing 150 as shown in Fig. 29. A trimmer head 156 is secured to each of the shafts 153 and a trimmer or trimmers 157 is or are secured to each of the heads as shown in Fig. 31. The shape and form of these trimmers is immaterial to the present invention, as they are employed simply to trim off the ends of the bristles and may be of such shape as may be desired, the first trimmers encountered by the brushes in their movements by the table 30 being a rough trim, so to speak, and the second set of trimmers encountered by the brushes in such movement being a more finished trim and a further and more detailed description is therefore omitted herein. Tubes 158 are secured to the housings 150 for the purpose of removing, as by vacuum apparatus to which the tubes are secured, the cuttings produced by the trimmers, such apparatus not being shown herein. As hereinbefore mentioned the trimmers may be of any suitable form or construction operating in connection with a set of guides or supports for the bristles while being trimmed, and disposed in the form of plates 159 projecting from a block 159' and spaced apart to receive the crosswise rows of bristles as they are swept into the spaces by the circular movement of the brushes on the table 30. The trimmers 157 as herein shown are of saw-tooth shape and comprise the rotary members cooperating with a set 160 of stationary trimmers of reverse saw-tooth shape, as shown in Fig. 33, formed on a block 160', said trimmers performing a shearing action upon the bristles crosswise of the head, as shown in Fig. 31.

After leaving the trimmers just described the brushes are carried by the table 30 at its next two one-step movements into the zone of operation of a final shaping mechanism which is supported on a bracket 161 projecting from a bracket base 162, the latter being movably secured to the sleeve 32 for adjustment in any suitable manner, and as hereinbefore described with respect to the bracket base 42, but not specifically shown herein. This final shaping mechanism comprises a shaft 163 supported in a bearing upon the bracket 161 in a manner similar to that of the bracket base 42. A pinion 164 meshing with the actuating gear 52 is secured to the shaft 163 having a cam 165 secured thereto containing a groove engaging a roller on a plunger 166 mounted in bearings projecting from the base 162, as shown in Fig. 34 of the drawings. The plunger is engaged by a bell crank lever 167 pivotally supported on the bracket 161 as at 168. A connecting rod 169 is pivotally attached at its opposite ends to the bell crank lever and to a pendant arm for support of the final shaping mechanism hereinbefore referred to. The connecting rod 169 is formed in two pieces secured together for lengthwise adjustment as by means of a screw bolt extending from one piece through a slot in the other piece in a manner common to adjustments of this type, and the pendant arm is also formed in two pieces 170—171 secured together for lengthwise adjustment as by means of a screw bolt in one piece extending through a slot in the other piece similar to the connection of the two pieces of the connecting rod 169, both of which connections are shown in Figs. 34 and 36 of the drawings, the adjustment in the connecting rod being for varying the zone of swinging movement of the pendant arm and the connection in the pendant arm being for the purpose of varying the path of movement of said arm vertically.

A base plate 172 secured to the bracket 161 has a supporting plate 173 extending at right angles thereto for the support of the final shaping mechanism hereinabove mentioned. This supporting plate has an extension 174 with a bearing 175 formed at its end for the spindle 176 of a motor 177 resting on a shelf 178 projecting from the supporting plate 173, as shown in Figs. 1, 34 and 35 of the drawings.

The pendant arm is formed at its upper end as a fork 179 straddling the bearing 175 and is supported on the axis of the motor spindle 176, the lower end of the pendant arm comprising the piece 170 also being in the shape of a fork within the branches 180 and 181 of which a shaft 182 of a forming wheel 183 is mounted, a grooved pulley 184 secured to said shaft receiving a belt 185 extending from a grooved pulley 186 secured to the motor spindle 176 by means of which the forming wheel 183 is driven. This wheel is of grooved form on its periphery and has an abrading action upon the bristles of tooth brushes to impart a form of ridged shape to the ends of said bristles comprising the brush and lengthwise thereof and projecting from the bases 34 as shown in Fig. 35 of the drawings. A housing 187 for a fan 188 is secured to the side of the fork 181 as by means of a pivot screw 189 to adjustably position a shaft supporting arm 190 for belt tensioning purposes, said fan removing the effects produced by the abrading action of the wheel 183 and which may be carried away in any suitable manner. The shaft supporting arm 190 extending upwardly from the housing 187 has at its upper end a bearing 191 for a fan driving shaft 192 having driving pulleys 193—194 secured thereto at its opposite ends, as shown in Fig. 35, the pulley 193 being pressed into contact with the belt 185, by means of which the belt is driven. A tensioning arm 195 extending from the supporting arm 190 alongside the part 170 of the pendant rod is adjustably attached to said pendant rod as by means of a screw 196 passing through a slot in the tensioning arm into the pendant rod (170—171) as a means for adjusting the tension of the belt 185 on the pulley 186, as shown in Fig. 34, said supporting arm turning on the pivot screw 189 for such adjustment purposes. A driving belt 197 extends from the pulley 194 around a pulley 198 to which the fan 188 is secured.

Figure 3B:
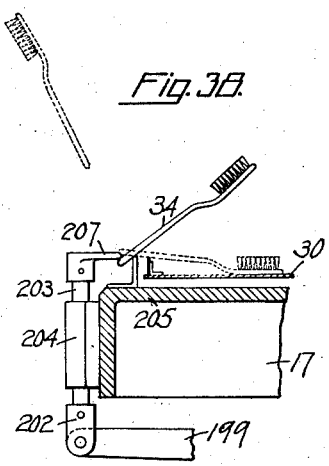
Figure 3 is a detail view in horizontal section illustrating in plan the rotating table for conveying the brush backs from station to station and on a plane denoted by the broken line 3—3 of Fig. 2.

After leaving the final trimming mechanism the brushes are carried in the next two one-step movements to ejecting mechanism which comprises an ejecting lever 199 pivotally mounted on a bracket 200 secured to the under side of the stationary table 17, the end of the lever having a roller engaging an ejecting cam 201 secured to the end of the table rotating or indexing shaft 24, as shown in dotted lines in Fig 4. The opposite end of said lever is attached to the base 202 of an ejecting plunger 203 mounted for vertical reciprocating movement in a bearing 204 secured to the edge of the stationary table 17, as shown in Figs. 1, 3 and 4 of the drawings. An ejecting plate 205 having an upturned flange 206 is secured to the top of the table 17 said flange forming a fulcrum for the brushes as the outer ends of the brush handles pass on to said flange and underneath an ejector 207 secured to the end of the plunger 203, as shown in Fig. 38 (sheet 1) of the drawings.

In operation as the brushes successively reach the ejecting mechanism the tip ends of the handles are positioned underneath the ejector 207, resting a slight distance backwardly therefrom upon the fulcrum 206. At this time the cam 39 releases the brush from the grasp of the clamping jaws and the cam 201 releasing the cam end of the lever 199 the opposite end of the lever is depressed, as by a spring (not shown), causing the ejector 207 to press upon the end of the brush handle, and the cam being shaped to permit a somewhat quick movement to the ejector the brushes are tipped upwardly and thrown end over end into a receptacle placed to receive them. A seating roller 208 is rotatably mounted on the end of a bent supporting rod 209 extending from a bracket 210 secured to the side of a hopper support 211 extending upwardly from the stationary table as shown in Fig. 5. Said roller is for the purpose of seating the brush backs firmly on the rotating table 30 between the jaws comprising the clamping holders, the roller pressing the brush backs down as they pass underneath the roller. A support 212 for a switch actuator 213 is mounted on the hopper support 211, the actuator being in position for engagement with the brush backs as they pass under the actuator. This is a stop motion device which may be of any suitable form and for which reason a further and detailed description is omitted herein, it being sufficient to state that the actuator is maintained in a certain position by the brush backs to maintain the circuit for operation of the motor 8. Should a brush back fail to issue from the hopper 35 the position of the switch will be changed to cut the electric current and thereby stop the operation of said motor and consequently the operation of the machine.

A brush back guide 214 is secured at one end to the hopper 35 and extends from said hopper in the direction of rotation of the table 30. After passing from the hopper the ends of the handles of the brush backs are moved along the guide 214 keeping them in position in the clamping holders until just before said handles encounter the brush seating member 38' hereinbefore described. This ensures that the brush backs will be maintained in position in the clamping holders until the movable jaws of each clamping holder is actuated by its spring to firmly clamp the brush backs in place, as shown in Fig. 1 of the drawings.

The vertical position of the housings 150 and hence of the trimmers 157 may be determined by means of adjusting screws 216 extending from the housings 150 and seated against the upper edges of the supporting flanges 148 of the bracket 147, as shown in Figs. 28 and 31 of the drawings.

We claim:

1. A brush making machine including a supporting table, means for imparting step-by-step advancing movement to said table, clamping holders positioned in spaced apart relation upon said table, each holder comprising two members having a tapered space between them, one of said holders being slidably mounted to decrease and increases the width of said tapered space, a hopper for brush backs deposited therein for vertical movement, the lower end of said hopper being positioned over the circular path of movement of said holders to locate the wider part of the brush heads over the wider part of the space between the holder members in their open position, means for operating said slidable holder members to decrease and increase the width of said space and thereby retain and release said brush backs resting upon the table between said holder members, and mechanism located in proximity to the path of said holders for collecting, forming, and applying brush tufts to said backs when stationary under said mechanism.

2. A brush making machine including a supporting table, means for imparting a step-by-step rotating movement to said table, clamping holders positioned in spaced-apart relation upon said table each holder comprising two members having a tapered space between them, one of said holders being slidably mounted to decrease and increase the width of said tapered space, a hopper for brush backs deposited therein for vertical movement, the lower end of said hopper being positioned over the circular path of movement of said holders to locate the wider part of the brush heads over the wider part of the space between the holder members in their open position, means for operating said slidable holder members to decrease and increase the width of said space and thereby retain and release said brush backs resting upon the table between said holder members, and mechanism located in proximity to the path of said holders for collecting, forming, and applying brush tufts to said backs when stationary under said mechanism.

3. A brush making machine including a supporting table secured to an underlying support therefor, means for imparting step-by-step rotating movement to said table, clamping holders positioned in spaced apart relation upon said table having a tapered space between them, one of said holders being slidably mounted to decrease and increase the width of said tapered space, a receptacle located above the table for the vertical supply of brush backs to said holders, a cam located in a fixed position relative to said slidable holder for the operation thereof to hold said slidable holders in clamping position for a major portion of the period of rotation of said table and to release said brush backs at the end of said period, and mechanism located in proximity to the path of said holders for collecting from the bottom of a hopper and for forming and for applying bristle tufts to said brush backs when stationary under said mechanism.

4. A brush making machine including a supporting table, means for imparting step-by-step advancing movement to said table, a clamping holder located upon said table, a receptacle located above said table for the vertical supply of brush backs to said holder, means for operating said holder to retain and release said brush backs, a support for brush backs constituting a fulcrum support upon said table with the ends of said backs slightly overhanging said fulcrum support, an ejector located in proximity to and overlying the path of said ends, and means for quickly and heavily pressing said ejector with a striking blow into contact with said ends when the table is stationary and thereby force said ends against said fulcrum support to thereby exert a flipping action on said brush backs to flip the backs with an end over end motion through the air when released by said holder.

5. A brush machine including a supporting table, means for imparting a step-by-step advancing movement to said table, clamping holders arranged in pairs, each pair comprising two members relatively movable one with respect to the other for cooperative clamping and releasing actions, said pairs of holders being positioned in spaced apart relation upon said table, a cam positioned adjacent the edge of said table for contact with said holders to impart one of said actions thereto, means for effecting the other of said actions, a receptacle located above the table and carried thereby for the vertical supply of brush backs to said holders, a bristle hopper carried by said table beside said receptacle for supply of bristles from the lower end of said hopper and mechanism located in proximity to the path of said holders for collecting said bristles and for forming them into tufts and for applying said tufts to said brush backs when stationary under said mechanism.

6. A brush making machine including a supporting table, means for imparting a step-by-step advancing movement to said table, clamping holders arranged in pairs each pair comprising two members relatively movable one with respect to the other for cooperative clamping and releasing actions, said pairs of holders being positioned in spaced apart relation upon said table, a cam positioned adjacent the edge of said table for contact with said holders to impart said releasing action thereto, means for effecting clamping action of said holders, a receptacle located above the table for the vertical supply of brush backs into the space between said holders, a bristle hopper carried by said table beside said receptacle, and mechanism located in proximity to the path of said holders for collecting said bristles and for forming them into tufts and for applying said tufts to said brush backs when stationary under said mechanism.

7. A brush making machine including a supporting table, means for imparting a step-by-step advancing movement to said table, clamping holders positioned in spaced apart relation upon said table, a receptacle located above the table for the vertical supply of brush backs to said holders, means for operating said holders to retain and to release said brush backs, mechanism located in proximity to the path of said holders for forming and for applying bristle tufts to said backs when stationary under said mechanism, and means eccentrically mounted relative to the path of movement of the ends of said backs and having a recess to receive said ends to forcibly seat them by endwise movement within said clamping holders.

8. A brush making machine including a supporting table, means for imparting a step-by-step advancing movement to said table, clamping holders positioned in spaced apart relation upon said table, a receptacle located above the table for the vertical supply of brush backs each having a plurality of rows of bristle holes to said holders, means for operating said holders to retain and to release said brush backs and a plurality of spaced apart mechanisms located in proximity to the path of said holders, each of said mechanisms being arranged relatively to a particular row of holes for forming and for successively applying different rows of bristle tufts to said backs when stationary under said mechanisms.

9. A brush making machine including a rotatably mounted supporting table, means for imparting step-by-step rotating movement to said table, clamping holders positioned in spaced apart relation upon said table, a receptacle located above the table for the vertical supply of brush backs with drilled holes arranged in rows therein to said holders, mechanical means for automatically operating said holders to retain and to release said brush backs, a plurality of spaced apart mechanisms located in proximity to the curved path of said holders each for forming and for successively applying different complete rows of bristle tufts to said backs when stationary under said mechanisms, and means located in the curved path of said backs for trimming the ends of said bristles following the application thereof to said backs.

10. A brush making machine including a stationary table, a supporting sleeve secured to and rising from said table, a supporting table rotatably mounted on and surrounding said sleeve, clamping holders positioned in spaced apart relation upon said supporting table, a receptacle located above the supporting table for the supply of brush backs with drilled holes arranged in rows therein to said holders, mechanical means for automatically operating said holders to retain and release said brush backs, a driving shaft rotatably mounted within said sleeve, a supporting bracket secured to and extending radially from said sleeve, mechanism located on said bracket and overlying the path of said holders for performing operations upon said brush backs as they are passed underneath said mechanism, and an operative connection between said mechanism and said driving shaft for operation of said mechanism.

11. A brush making machine including a stationary table, a supporting sleeve secured to and rising from said table, a supporting table rotatably mounted on and surrounding said sleeve, clamping holders positioned in spaced apart relation upon said supporting table, a receptacle located in a stationary position above the supporting table for the supply of brush backs with drilled holes arranged in rows therein to said holders, mechanical means for automatically operating said holders to retail and release said brush backs, a driving shaft rotatably mounted within said sleeve, a supporting bracket secured to and extending radially from said sleeve, mechanism mounted on said bracket overlying the path of said holders for forming and for applying bristle tufts to said brush backs, and an operative connection between said mechanism and said driving shaft for operation of said mechanism.

12. A brush making machine including a stationary table, a supporting sleeve secured to and rising from said table, a supporting table rotatably mounted on and surrounding said sleeve, clamping holders positioned in spaced apart relation upon said supporting table, a receptacle located in a stationary position above the supporting table for the supply of brush backs with drilled holes arranged in rows therein to said holders, machanical means for automatically operating said holders to retain and release said brush backs, a driving shaft rotatably mounted within said sleeve, a plurality of supporting brackets secured to and extending radially from opposite sides of said sleeve, mechanisms mounted on said brackets overlying the path of said holders for performing different operations upon said brush backs as they pass underneath said mechanisms, and an operative connection between said mechanisms and said driving shaft for operation of said mechanisms.

13. A brush making machine including a stationary table, a supporting sleeve secured to and rising from said table, a supporting table rotatably mounted on and surrounding said sleeve, clamping holders positioned in spaced apart relation upon said supporting table, a receptacle located in a stationary position above the supporting table for the supply of brush backs with drilled holes arranged in rows therein to said holders, mechanical means for automatically operating said holders to retain and release said brush backs, a driving shaft rotatably mounted within said sleeve, a supporting bracket secured to and extending radially from said sleeve, mechanism mounted on said bracket overlying the path of said holders for forming and for applying bristle tufts to said brush backs, an operative connection between said mechanism and said driving shaft for operation of said mechanism, and an operative connection between said driving shaft and said mechanism for imparting step-by-step rotating movement to said supporting table.

14. A brush making machine including a stationary table, a supporting sleeve secured to and rising from said table, a supporting table rotatably mounted on and surrounding said sleeve, clamping holders positioned in spaced apart relation upon said supporting table, a receptacle located above the supporting table for the supply of brush backs each having a plurality of rows of holes to said holders, means for operating said holders to retain and release said brush backs, a driving shaft rotatably mounted within said sleeve, a plurality of supporting brackets secured to and extending radially from said sleeve, mechanisms mounted on each of said brackets and overlying the path of said holders for forming and for applying bristle tufts to said brush backs, means for imparting step-by-step rotating movement to said supporting table to halt it with a different row of holes underneath one of said mechanisms at each successive halt of the supporting table, and an operative connection between said mechanisms and said driving shaft.

15. A brush making machine including a stationary table, a supporting sleeve secured to and rising from said table, a supporting table rotatably mounted on and surrounding said sleeve, clamping holders positioned in spaced apart relation upon said supporting table, a receptacle located above the supporting table for the supply of brush backs to said holders, means for operating said holders to retain and release said brush backs, a driving shaft rotatably mounted within said sleeve, a supporting bracket secured to and extending radially from said sleeve, mechanism mounted on said bracket overlying the path of said holders for forming and for applying bristle tufts to said brush backs, an operative connection between the driving shaft above the top end of said sleeve and said mechanism for operation of the latter, and an operative connection between said driving shaft below the bottom end of said sleeve for imparting rotating movement to said supporting table.

16. A brush making machine including a supporting carrier, means for imparting a step-by-step advancing movement to said carrier, clamping holders positioned in spaced apart relation upon said carrier, a receptacle located above the supporting table for supply of brush backs to said holders, a bristle hopper with its outlet end located above the path of said holders for supply of bristles to brush backs secured in said holders, a picker bar reciprocally mounted adjacent the outlet end of said hopper to collect bristle tufts therefrom, a tuft receiver positioned to take said tufts thrust through the picker bar, means for halting movement of the picker bar over said receiver, and means for pushing the tufts through the picker bar and through the receiver into holes in said brush backs while said parts are positioned in line.

17. A brush making machine including a supporting carrier, means for imparting a step-by-step advancing movement to said carrier, clamping holders positioned in spaced apart relation upon said carrier, a receptacle located above the supporting table for supply of brush backs to said holders, a bristle hopper with its outlet end located above the path of said holders for supply of bristles to brush backs secured in said holders, a picker bar reciprocally mounted adjacent the outlet end of said hopper to collect bristle tufts therefrom, a tuft receiver positioned to take said tufts thrust through the picker bar, means for halting movement of the picker bar with holes therein in line with holes through the receiver, means for lowering the receiver into contact with brush backs on said carrier, and means for pushing the tufts through the picker bar and through the receiver into holes in the brush backs while said parts are positioned in line.

18. A brush making machine including a supporting carrier, means for imparting a step-by-step advancing movement to said carrier, clamping holders positioned in spaced apart relation upon said carrier, a bristle hopper with its outlet end located above the path of said holders for supply of bristles to brush backs secured in said holders, a picker bar reciprocally mounted adjacent the outlet end of said hopper to collect bristle tufts therefrom, a tuft receiver to take said tufts thrust through the picker bar, means for projecting a wire across said tufts in the receiver, means in the receiver for cutting said wire into short lengths, one length for each tuft, and means for pushing said tufts with the wires thereon through the picker bar and through the receiver into holes in said brush backs while said parts are positioned in line.

19. A brush making machine including a supporting carrier, means for imparting a step-by-step advancing movement to said carrier, clamping holders positioned in spaced apart relation upon said carrier, a bristle hopper with its outlet end located above the path of said holders for supply of bristles to brush backs secured in said holders, a picker bar reciprocally mounted adjacent the outlet end of said hopper to collect bristle tufts therefrom, a tuft receiver positioned to take said tufts thrust through the picker bar while supported on said receiver, a support for said receiver, a support for fingers to push said tufts through the picker bar and through the receiver into said holes in the brush backs while said parts are positioned in line, and means for simultaneously imparting movement to both of said supports to position the receiver against said brush backs upon said carrier.

20. A brush making machine including an open top box supporting frame, a stationary table supported around its outer edge by said frame and closing the top thereof, said table having a raised rim portion bounding a recessed central portion, a supporting sleeve secured to and rising from the bottom of said recess, driving mechanism located within said supporting frame and including a main driving shaft extending through said sleeve to the outer end thereof, a rotating support rotatably mounted on the inner end of said sleeve, indexing members carried by said support, an indexing member extending through the bottom of said recess and engageable therein with said indexing members to impart step-by-step rotating movement to said rotating support, an operative connection between said indexing device and said driving mechanism, a table secured to said rotating support and extending outwardly therefrom for the support of brush backs, a hopper for brush backs supported on the rim of said table, means on the table to receive the brush backs to convey them in a circular path around the machine, a bracket secured at its inner end to said sleeve and projecting radially therefrom and having a broad supporting face, mechanism located on said face for operation upon brush backs on said rotating table, and an operative connection between said mechanism and the outer end of said driving shaft for the operation of said mechanism.

21. A brush making machine including a supporting frame, a stationary table supported around its outer edge by said frame and closing the top thereof, said table having a raised rim portion bounding a recessed central portion, a supporting sleeve having a flange seated on the bottom of said recess and rising from said bottom for the support along said sleeve of brush making mechanism, driving mechanism located within said supporting frame and including a main driving shaft extending through said sleeve to the outer end thereof, a rotating support rotatably mounted on the flange of said sleeve, an operative connection between said driving mechanism and said rotating support for imparting step-by-step rotating movement to said support, a table secured to said rotating support and extending outwardly therefrom for the support of brush backs above the rim of said stationary table, a hopper for brush backs supported on the rim of said table, means on the table to receive the brush backs to convey them in a circular path around the machine, a bracket secured at its inner edge to said sleeve and projecting radially therefrom and having a broad supporting face, mechanism located on said face for operation upon brush backs upon said table, and an operative connection between said mechanism and the outer end of said driving shaft for operation of said mechanism.

22. A brush making machine including a stationary table, a sleeve secured to and rising from said table for support along its side of brackets for brush making mechanisms, a driving shaft extending through said sleeve to the outer end thereof, means for operating said driving shaft, a table rotatably supported by said sleeve for the support of brush backs, means positioned in spaced relation on said table to receive and hold brush backs, a number of brackets secured at their inner edges to said sleeve and projecting radially therefrom and from the bottom to the top of said sleeve, operating shafts rotatably mounted at the upper end of each of said brackets, an operative connection between each of said shafts and said driving shaft at the upper end of the latter, a hopper for bristles supported on the face of each of said brackets, and bristle feeding and inserting mechanisms supported on each of said brackets between said bristle hopper and said sleeve and operatively connected with said operating shaft on the top of said brackets.

23. A brush making machine including a stationary table, a sleeve secured to and rising from said table for support along its side of a bracket for brush making mechanism, a hopper for brush backs supported upon and rising from said stationary table, a table rotatably mounted above said stationary table, a driving shaft extending through said sleeve to the outer end thereof, an operative connection between said rotating table and said driving shaft, a bracket secured at its edge to said sleeve and extending substantially from the bottom to the top thereof, an operating shaft rotatably mounted at the upper end of said bracket and operatively connected with said driving shaft, a bristle hopper secured to the face of said bracket with its lower end overlying said rotatably mounted table, brush holders positioned in spaced relation on said rotatably mounted table to pass underneath the lower end of said bristle hopper, an extractor for removing bristles in the form of wisps from the lower end of said hopper and for conveying them to a position overlying said brush backs, means for inserting said wisps into brush backs as the latter reach a position underneath said extractor, and an operative connection between said inserting means and said operating shaft on the top of said bracket.

24. A brush making machine including a stationary table, a sleeve secured to and rising from said table, for support along its side of a bracket for brush making mechanism, a hopper for brush backs supported upon and rising from said stationary table, a table rotatably mounted above said stationary table, a driving shaft extending through said sleeve to the outer end thereof, an operative connection between said rotating table and said driving shaft, a bracket secured at its edge to said sleeve and extending substantially from the bottom to the top thereof, an operating shaft rotatably mounted at the upper end of said bracket and operatively connected with said driving shaft, a bristle hopper secured to the face of said bracket with its lower end overlying said rotatably mounted table, brush holders positioned in spaced relation on said rotatably mounted table to pass underneath the lower end of said bristle hopper, a picker bar mounted for reciprocating movement underneath the lower end of said hopper to extract bristles in the form of wisps from said hopper, means connected with said driving shaft for operating said picker bar, and means operatively connected with said operating shaft to thrust said wisps through holes in said picker bar into brush backs.

25. A brush making machine including a stationary table, a sleeve secured to and rising from said table for support along its side of a bracket for brush making mechanism, a hopper for brush backs supported upon and rising from said stationary table, a table rotatably mounted above said stationary table, a driving shaft extending through said sleeve to the outer end thereof, an operative connection between said rotating table and said driving shaft, a bracket secured at its edge to said sleeve and extending substantially from the bottom to the top thereof, an operating shaft rotatably mounted in the upper end of said bracket and operatively connected with said driving shaft, a bristle hopper secured to the face of said bracket with its lower end overlying said rotatably mounted table, brush holders positioned in spaced relation on said rotatably mounted table to pass underneath the lower end of said bristle hopper, a picker bar mounted for reciprocating movement underneath the lower end of said hopper to remove bristles in the form of wisps from said hopper, an operative connection between said picker bar and said driving shaft, ways supported on the face of said bracket beside said bristle hopper, and means mounted for reciprocating movement in said ways to thrust said wisps through the picker bar into said brush backs, said thrusting means being operatively connected with said operating shaft.

26. A brush making machine including a stationary table, a sleeve secured to and rising from said table for support along its side of a bracket for brush making mechanisms, a hopper for brush backs supported upon and rising from said stationary table, a table rotatably mounted above said stationary table, a driving shaft extending through said sleeve to the outer end thereof, an operative connection between said rotating table and said driving shaft, a bracket secured at its edge to said sleeve and extending substantially from the bottom to the top thereof, a cam shaft mounted on the upper edge of said bracket and operatively connected with said driving shaft, a bristle hopper secured to the face of said bracket with its lower end overlying said rotatably mounted table, brush holders positioned in spaced relation on said rotatably mounted table to pass underneath the lower end of said bristle hopper, ways located on the face of said bracket beside said bristle hopper, a picker bar supported by said bracket at the lower end of said ways and operatively connected with said driving shaft to remove bristles in the form of wisps from the lower end of said hopper and to move said wisps to a position overlying said brush backs, means supported by said ways for thrusting said wisps through said picker bar into brush backs located underneath the lower end of said ways, and a cam on said cam shaft operatively connected with said thrusting means for operation thereof.

27. A brush making machine including a stationary table, a sleeve secured to and rising from said table for support along its side of a bracket for brush making mechanism, a hopper for brush backs supported upon and rising from said stationary table, a table rotatably mounted above said stationary table, a driving shaft extending through said sleeve to the outer end thereof, an operative connection between said rotating table and said driving shaft, a bracket secured at its edge to said sleeve and extending substantially from the bottom to the top thereof, a cam shaft rotatably mounted upon the upper end of said bracket and operatively connected with said driving shaft, a bristle hopper secured to the face of said bracket with its lower end overlying said rotatably mounted table, ways secured to said bracket and extending vertically thereon beside said bristle hopper, a picker bar supported for reciprocating movement on the lower edge of said bracket for removing bristles in the form of wisps from the lower end of said hopper, means supported by said ways for thrusting said wisps through said picker bar into brush backs, a cam on said cam shaft operatively connected with said thrusting means for the operation thereof, wire inserting mechanism located on the face of said bracket beside said ways for inserting a wire overlying the wisps on said picker bar, and a cam on said cam shaft operatively connected with said wire inserting means for operation of the latter.

28. A brush making machine including a stationary table, a sleeve secured to and rising from said table for support along its side of a plurality of brackets for brush making mechanisms, a hopper for brush backs supported upon and rising from said stationary table, a rotatably mounted table above said stationary table, a driving shaft extending through said sleeve to the outer end thereof, an operative connection between said rotating table and said driving shaft, a number of brackets secured at their edges to said sleeve in spaced relation and each bracket extending substantially from the bottom to the top of said sleeve, an operating shaft rotatably mounted in the upper end of each of said brackets and operatively connected with the upper end of said driving shaft, a bristle hopper secured to the face of each of said brackets with their lower ends overlying said rotatably mounted table, brush holders positioned in spaced relation on said rotatably mounted table to pass underneath the lower ends of said bristle hoppers, an extractor supported for reciprocating movement at the lower part of each of said brackets for removing bristles in the form of wisps from the lower ends of said hoppers and move them into positions overlying said brush backs, and means supported on each of said brackets for thrusting said wisps through said extractors into said brush backs.

29. In a brush making machine in combination with a rotatably mounted table having holders for brush backs secured in spaced relation thereon and including a sleeve having a driving shaft extending therethrough, a bracket secured to the side of said sleeve and extending vertically thereon, a bristle hopper mounted on said bracket, ways supported by said bracket beside said bristle hopper, a picker bar support mounted for vertical reciprocating movement in said ways, a perforated picker bar supported at one end for reciprocating movement on said picker bar support underneath the lower end of said hopper to extract bristles in the form of wisps therefrom, means mounted in said ways for vertical reciprocating movement of said picker bar support, and means mounted in said ways for thrusting said wisps through the picker bar into brush backs located on said rotatable table underneath said picker bar support.

30. In a brush making machine in combination with a rotatably mounted table having holders for brush backs secured in spaced relation thereon and including a sleeve having a driving shaft extending therethrough, a bracket secured to said sleeve and extending vertically thereon, a bristle hopper mounted on said bracket, ways supported by said bracket beside said bristle hopper, a bristle receiver mounted for vertical reciprocating movement in said ways and including a base, a perforated picker bar supported at one end for reciprocating movement on said bristle receiver underneath the lower end of said hopper to extract bristles in the form of wisps therefrom, means mounted in said ways for vertical reciprocating movement of said bristle receiver and picker bar, and means mounted in said ways for thrusting said wisps through the picker bar and through said bristle receiver.

HENRY CAVE.
ALFRED H. FULLER.
ALFRED L. LE FEBVRE.